(12) United States Patent
Akenine-Moller et al.

(10) Patent No.: US 10,379,611 B2
(45) Date of Patent: Aug. 13, 2019

(54) VIRTUAL REALITY/AUGMENTED REALITY APPARATUS AND METHOD

(71) Applicant: Intel Corporation, Santa Clara, CA (US)

(72) Inventors: Tomas G. Akenine-Moller, Lund (SE); Robert M. Toth, Lund (SE); Ingo Wald, Salt Lake City, UT (US); Aditya S. Yanamandra, Campbell, CA (US); Brent E. Insko, Portland, OR (US); Michael Apodaca, Folsom, CA (US); Prasoonkumar Surti, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/268,494

(22) Filed: Sep. 16, 2016

(65) Prior Publication Data
US 2018/0081429 A1    Mar. 22, 2018

(51) Int. Cl.
*G06F 3/01* (2006.01)
*G06T 1/20* (2006.01)
(Continued)

(52) U.S. Cl.
CPC ............. *G06F 3/013* (2013.01); *G06F 3/011* (2013.01); *G06F 3/012* (2013.01); *G06T 1/20* (2013.01);
(Continued)

(58) Field of Classification Search
CPC . G06F 3/013; G06F 3/012; G06T 1/20; G06T 3/0093; G06T 19/006; G06T 2200/24
See application file for complete search history.

(56) References Cited

U.S. PATENT DOCUMENTS

| 2012/0075433 A1 | 3/2012 | Tatzgern et al. |
| 2014/0173674 A1* | 6/2014 | Wolman ................. H04N 21/25 725/116 |

(Continued)

OTHER PUBLICATIONS

International Search Report and Written Opinion for Application No. PCT/US2017/046848, dated Nov. 20, 2017, 17 pages.

(Continued)

*Primary Examiner* — Yu Chen
(74) *Attorney, Agent, or Firm* — Nicholson De Vos Webster & Elliott LLP

(57) ABSTRACT

A virtual reality apparatus and method are described. For example, one embodiment of an apparatus comprises: a compute cluster comprising global illumination circuitry and/or logic to perform global illumination operations on graphics data in response to execution of a virtual reality application and to responsively generate a stream of samples; a filtering/compression module to perform filtering and/or compression operations on the stream of samples to generate filtered/compressed samples; a network interface to communicatively couple the compute cluster to a network, the filtered/compressed samples to be streamed over the network; a render node to receive the filtered/compressed samples streamed over the network, the render node comprising: decompression circuitry/logic to decompress the filtered/compressed samples to generate decompressed samples; a sample buffer to store the decompressed samples; and sample insertion circuitry/logic to asynchronously insert samples into a light field rendered by a light field rendering circuit/logic.

10 Claims, 45 Drawing Sheets

(51) Int. Cl.
*G06T 3/00* (2006.01)
*G06T 19/00* (2011.01)
*G06T 15/00* (2011.01)

(52) U.S. Cl.
CPC .......... *G06T 3/0093* (2013.01); *G06T 15/005* (2013.01); *G06T 19/006* (2013.01); *G06T 2200/24* (2013.01)

(56) References Cited

U.S. PATENT DOCUMENTS

| | | | |
|---|---|---|---|
| 2014/0327690 A1* | 11/2014 | McGuire | A63F 13/355 345/589 |
| 2015/0301599 A1 | 10/2015 | Miller | |
| 2016/0217760 A1 | 7/2016 | Chu et al. | |
| 2016/0238852 A1* | 8/2016 | Ellsworth | G02B 27/0179 |

OTHER PUBLICATIONS

International Preliminary Report on Patentability for Application No. PCT/US2017/046848, dated Mar. 28, 2019, 11 pages.

* cited by examiner

FIG. 9A GRAPHICS PROCESSOR COMMAND FORMAT
900
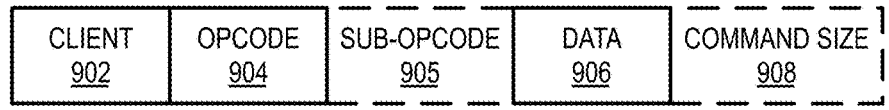
FIG. 9B GRAPHICS PROCESSOR COMMAND SEQUENCE
910
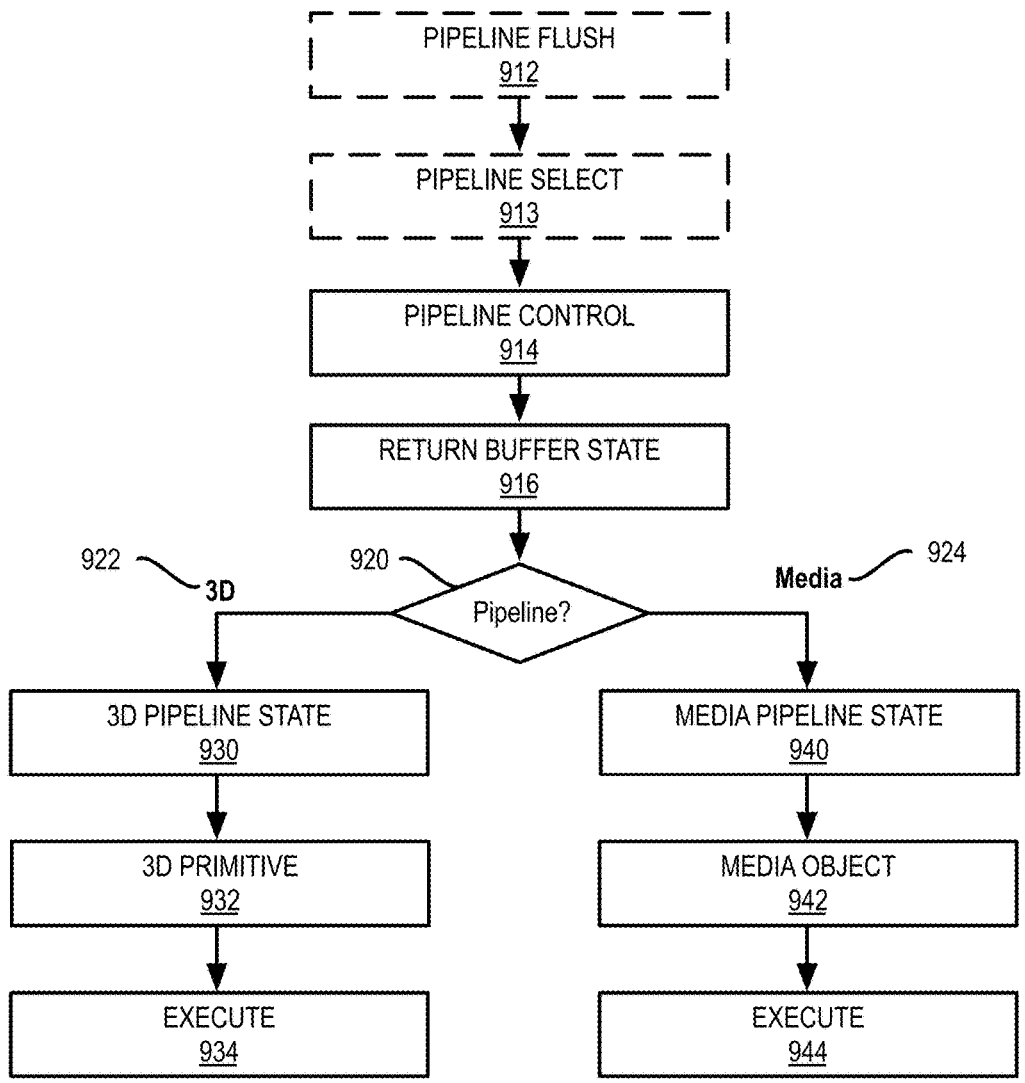

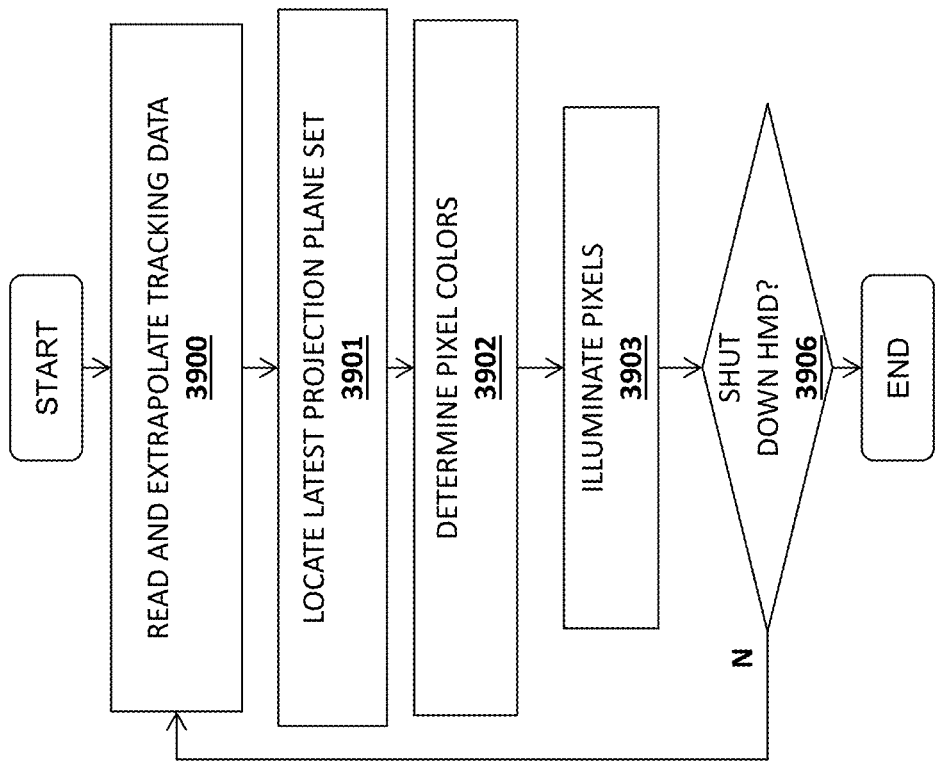

VIRTUAL REALITY/AUGMENTED REALITY APPARATUS AND METHOD

BACKGROUND

Field of the Invention

This invention relates generally to the field of computer processors. More particularly, the invention relates to a virtual reality/augmented reality apparatus and method.

Description of the Related Art

Virtual reality (VR) refers to data processing technologies that replicate a real or imagined environment by simulating a user's physical presence in that environment and, in some implementations, the user is provided with the ability to interact with the environment. Many current VR environments are displayed either on a computer screen or with a special virtual reality headset. Some simulations include additional sensory information such as sound through speakers or headphones targeted towards VR users.

In contrast to VR, which fully replaces the real world with a virtual one, augmented reality (AR) provides for a view of the physical, real-world environment whose elements have been augmented by supplemental sensory input such as graphics, audio, video, and/or GPS data.

BRIEF DESCRIPTION OF THE DRAWINGS

A better understanding of the present invention can be obtained from the following detailed description in conjunction with the following drawings, in which:

FIG. 9A is a block diagram illustrating a graphics processor command format according to an embodiment;

FIG. 9B is a block diagram illustrating a graphics processor command sequence according to an embodiment;

FIG. 39 illustrate an exemplary image frame having a region of interest, a secondary region, and an inaccurate region.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
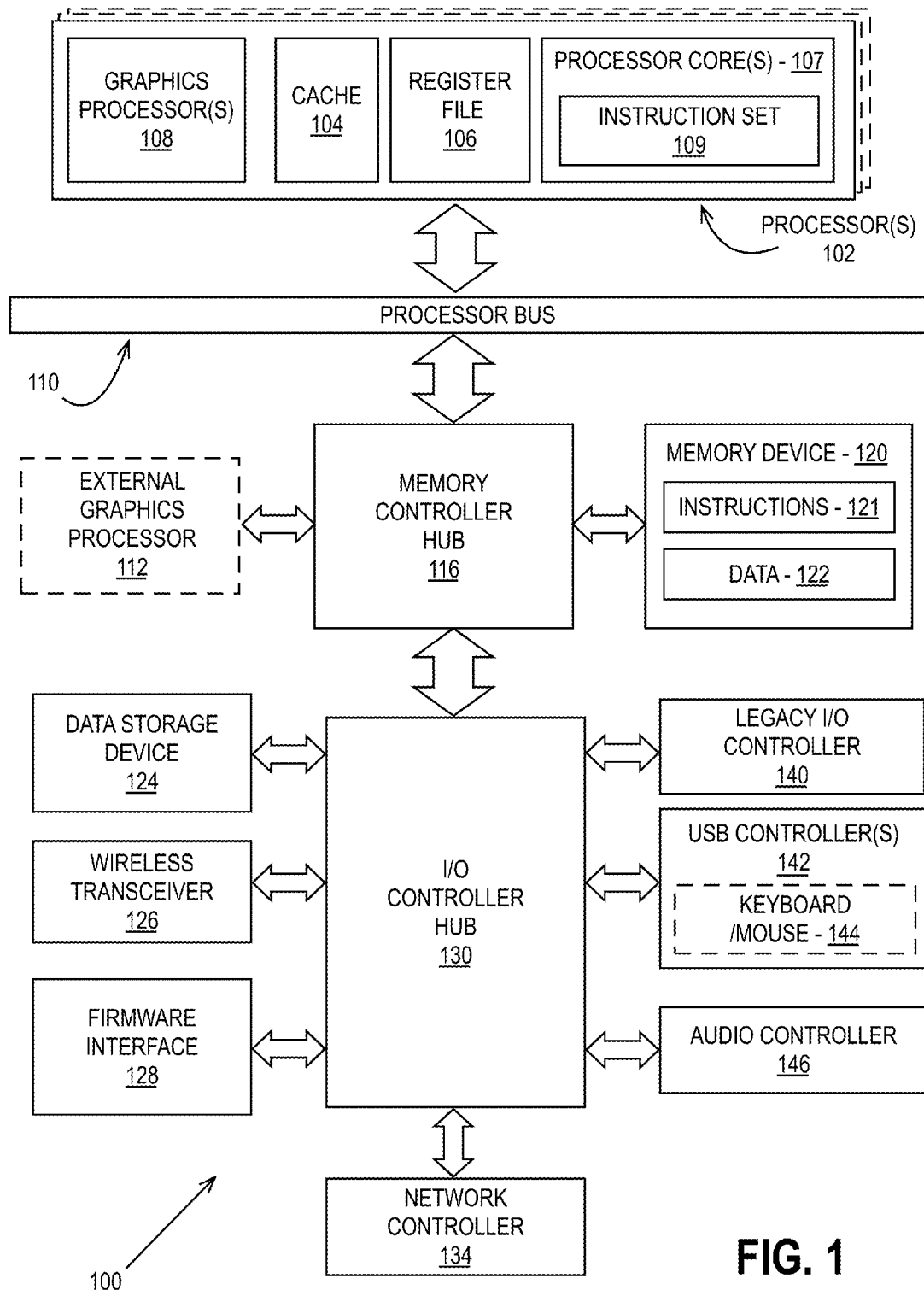
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
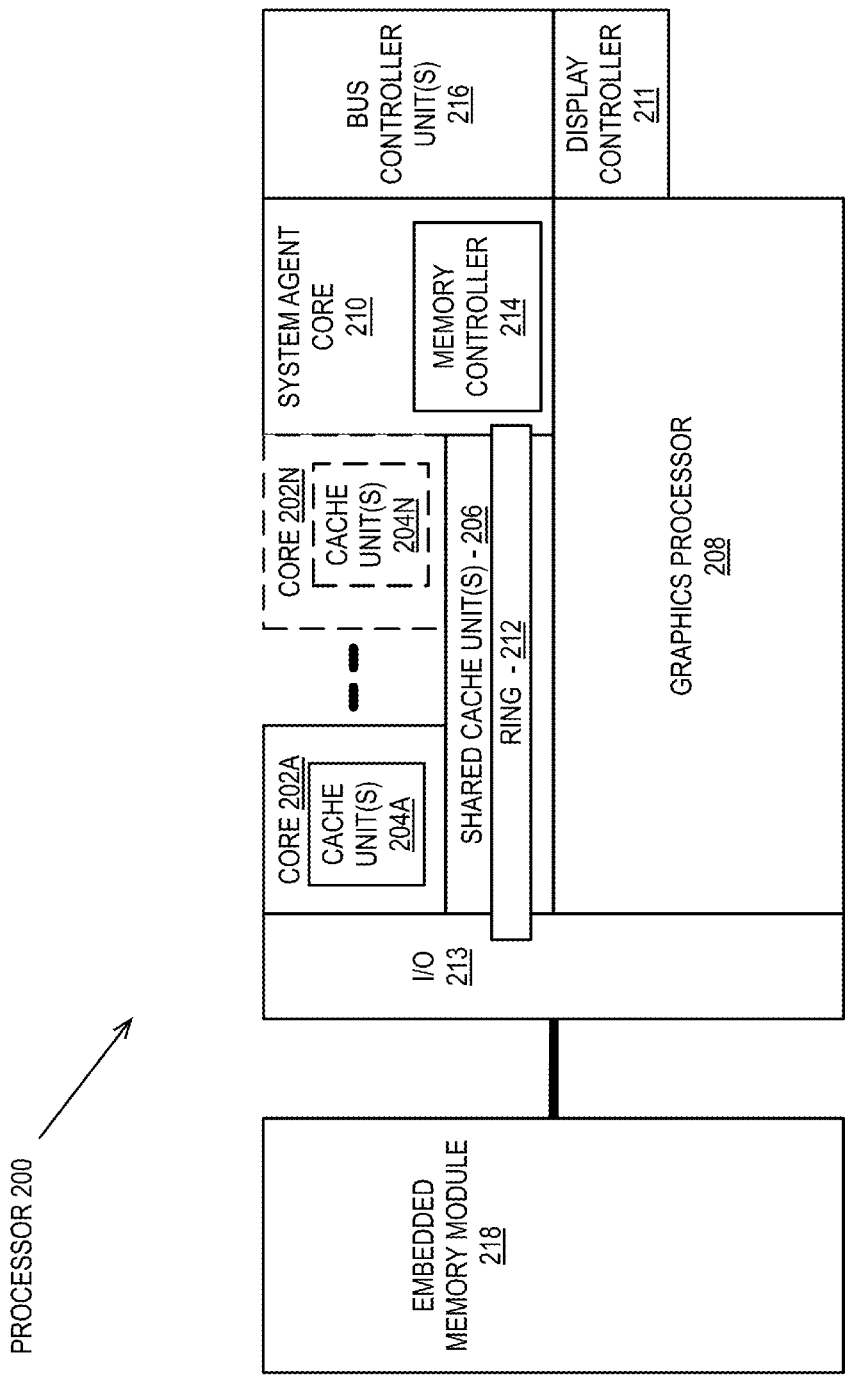
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
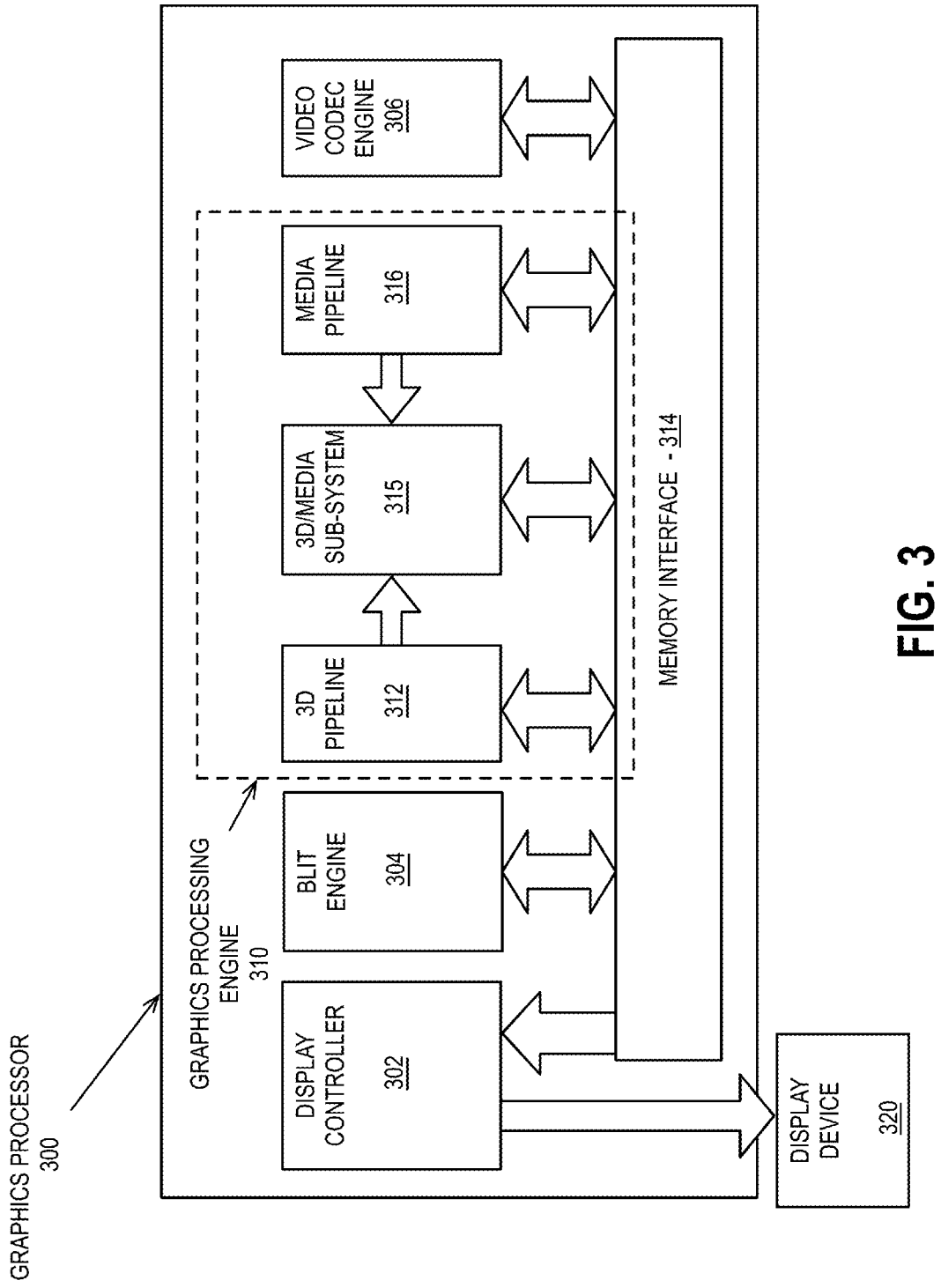
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
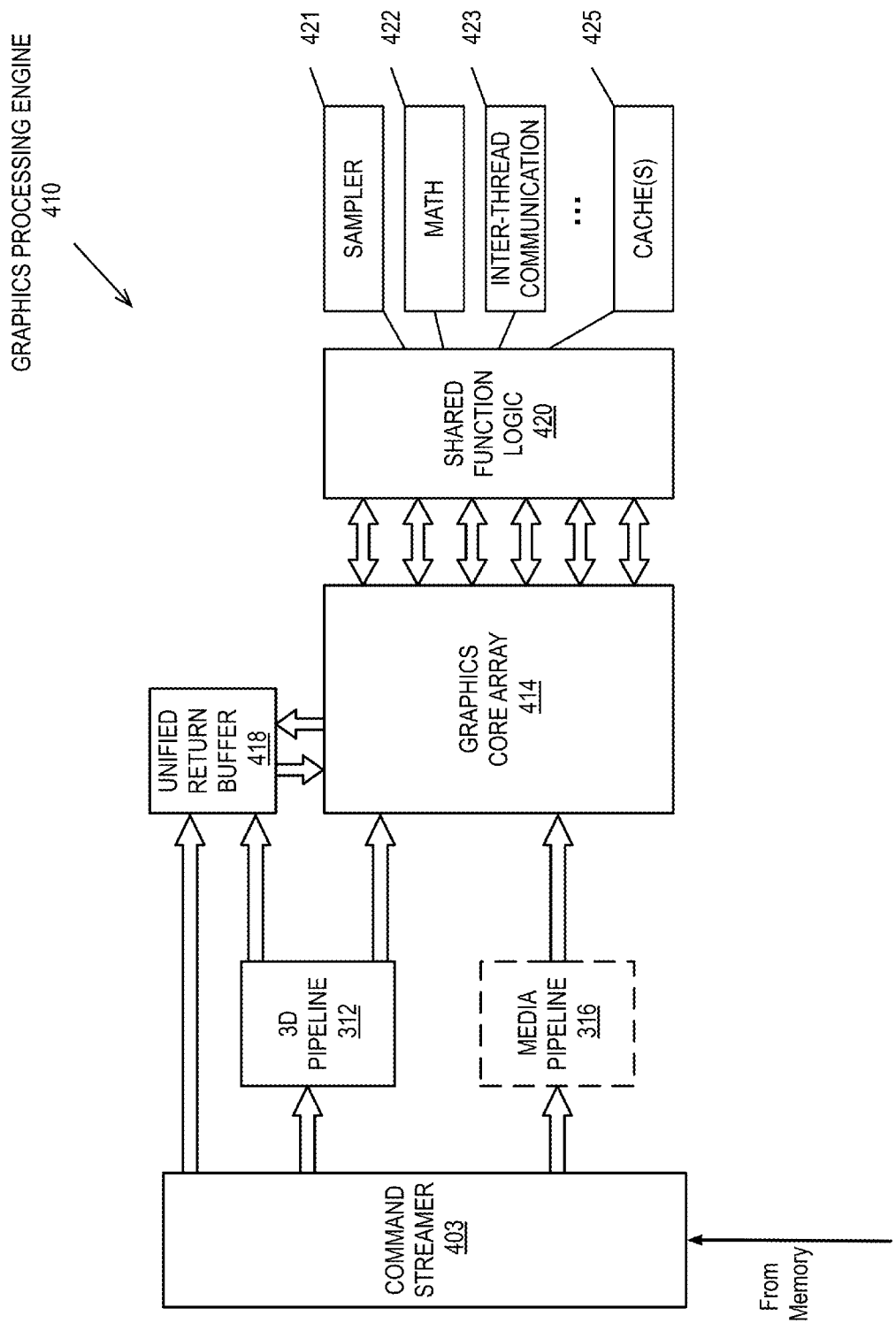
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
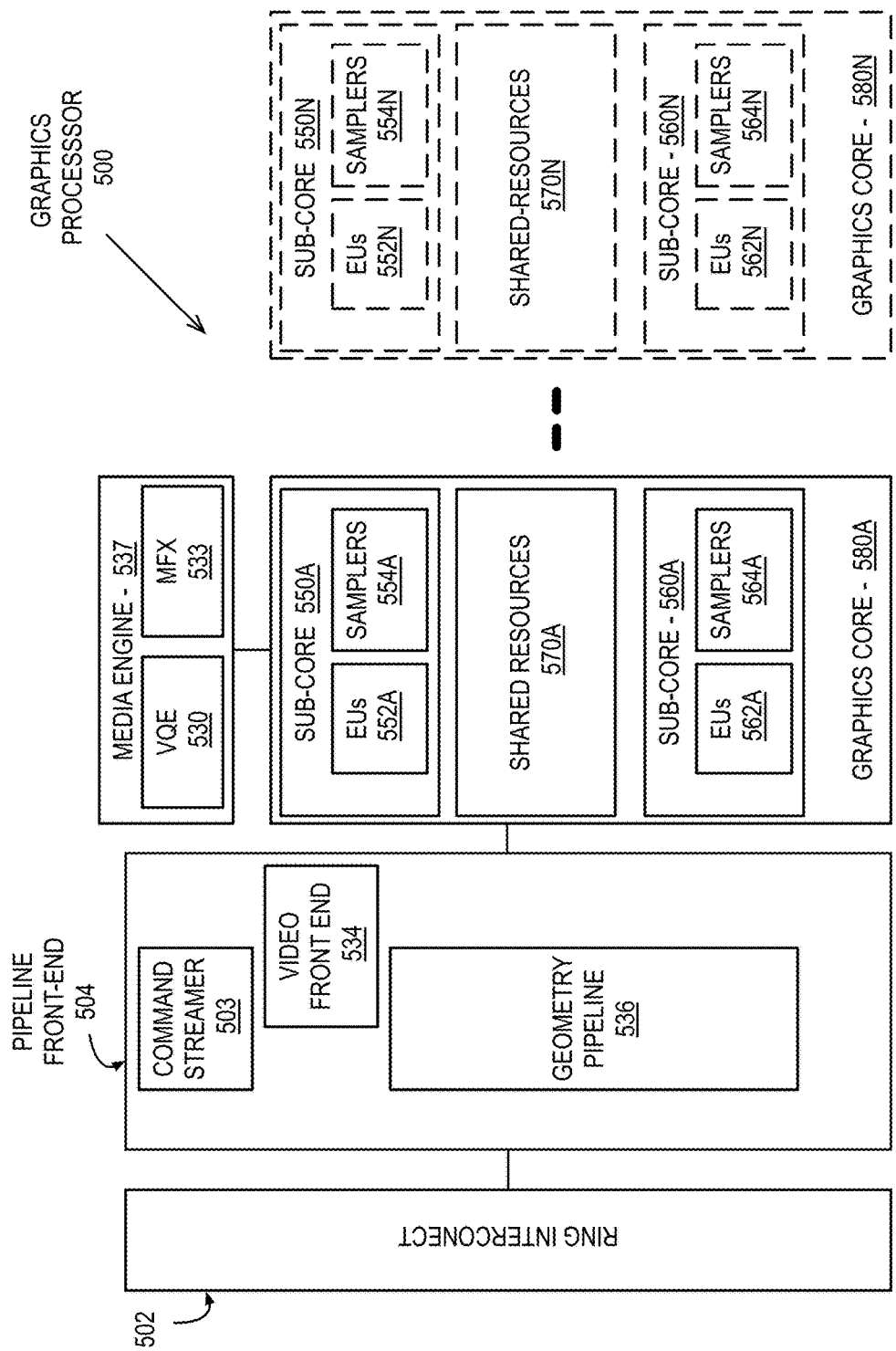
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
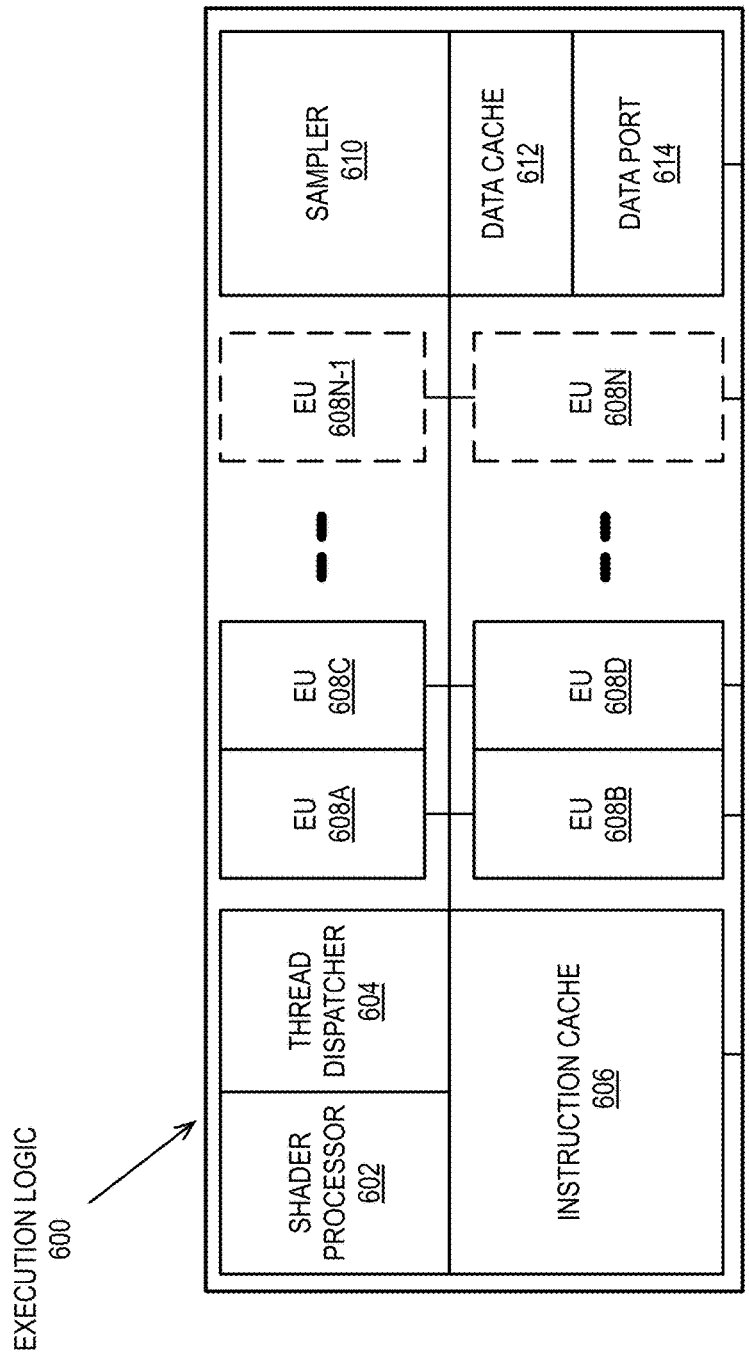
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
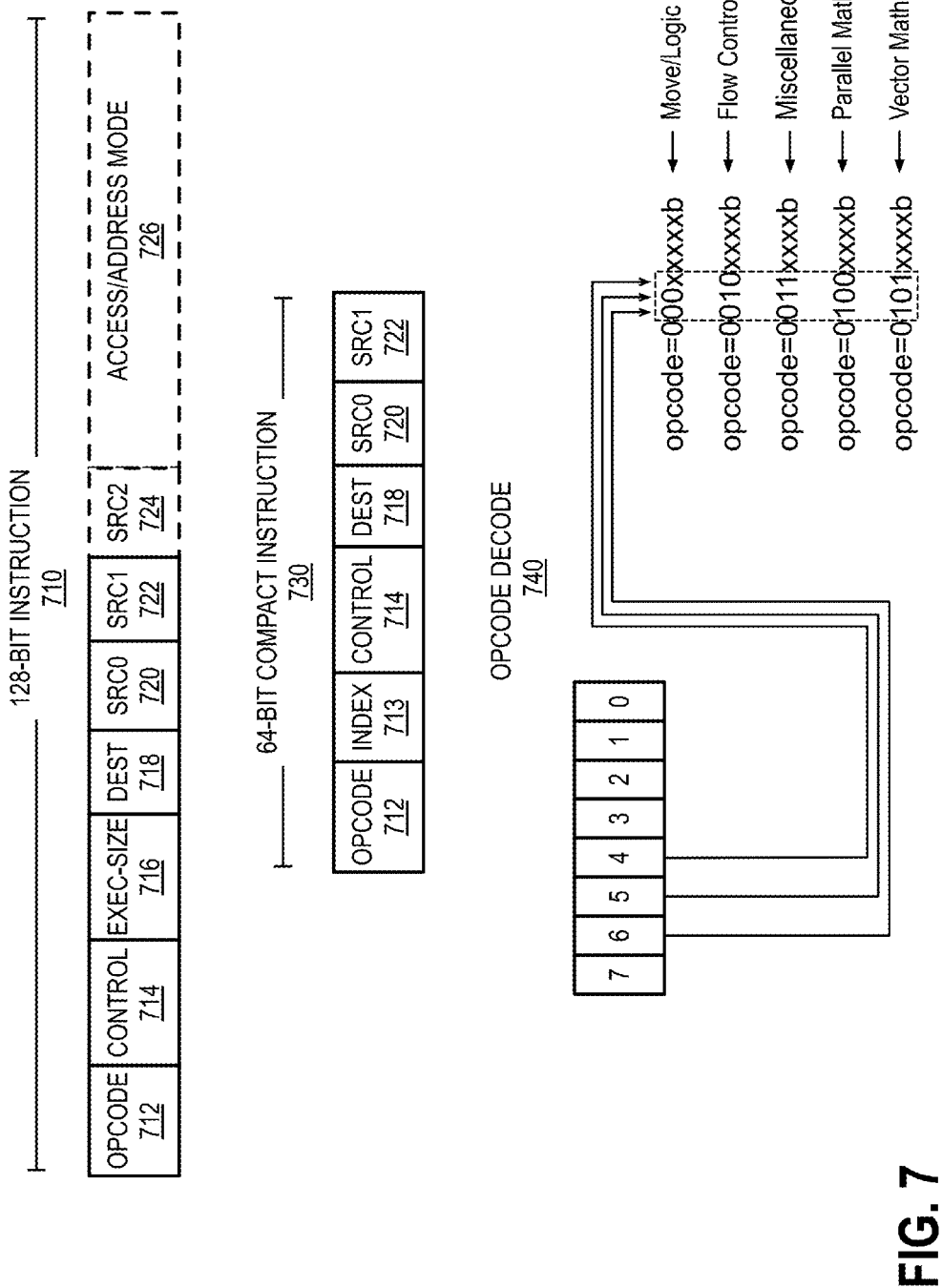
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
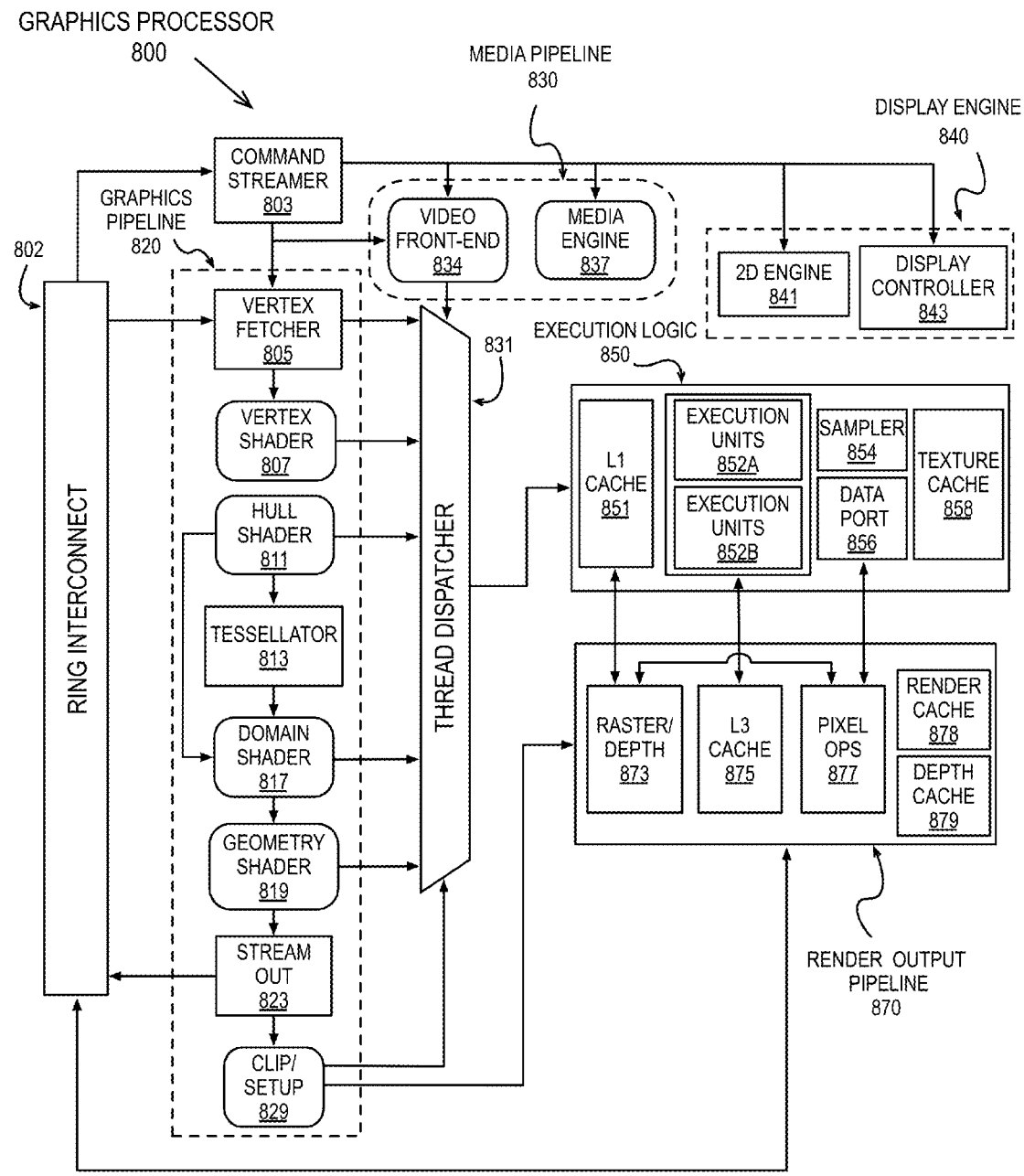
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A-852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
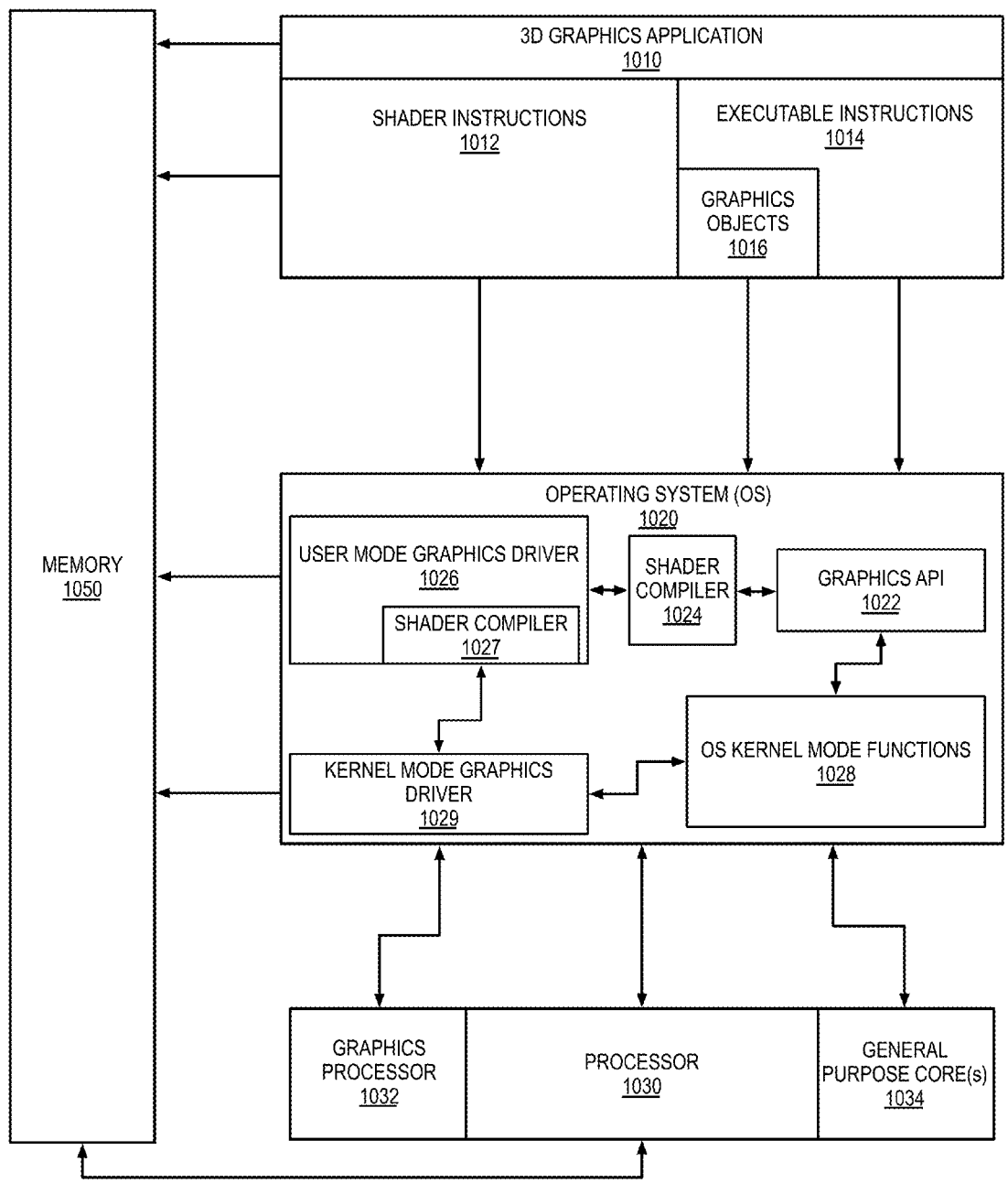
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
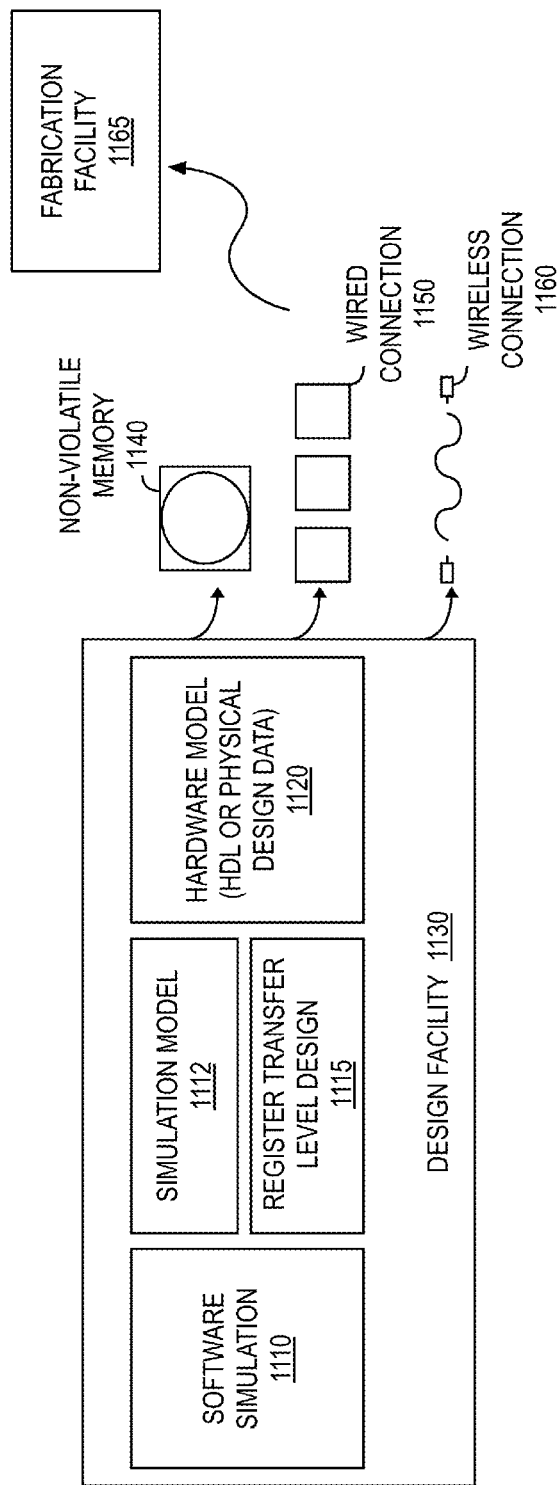
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
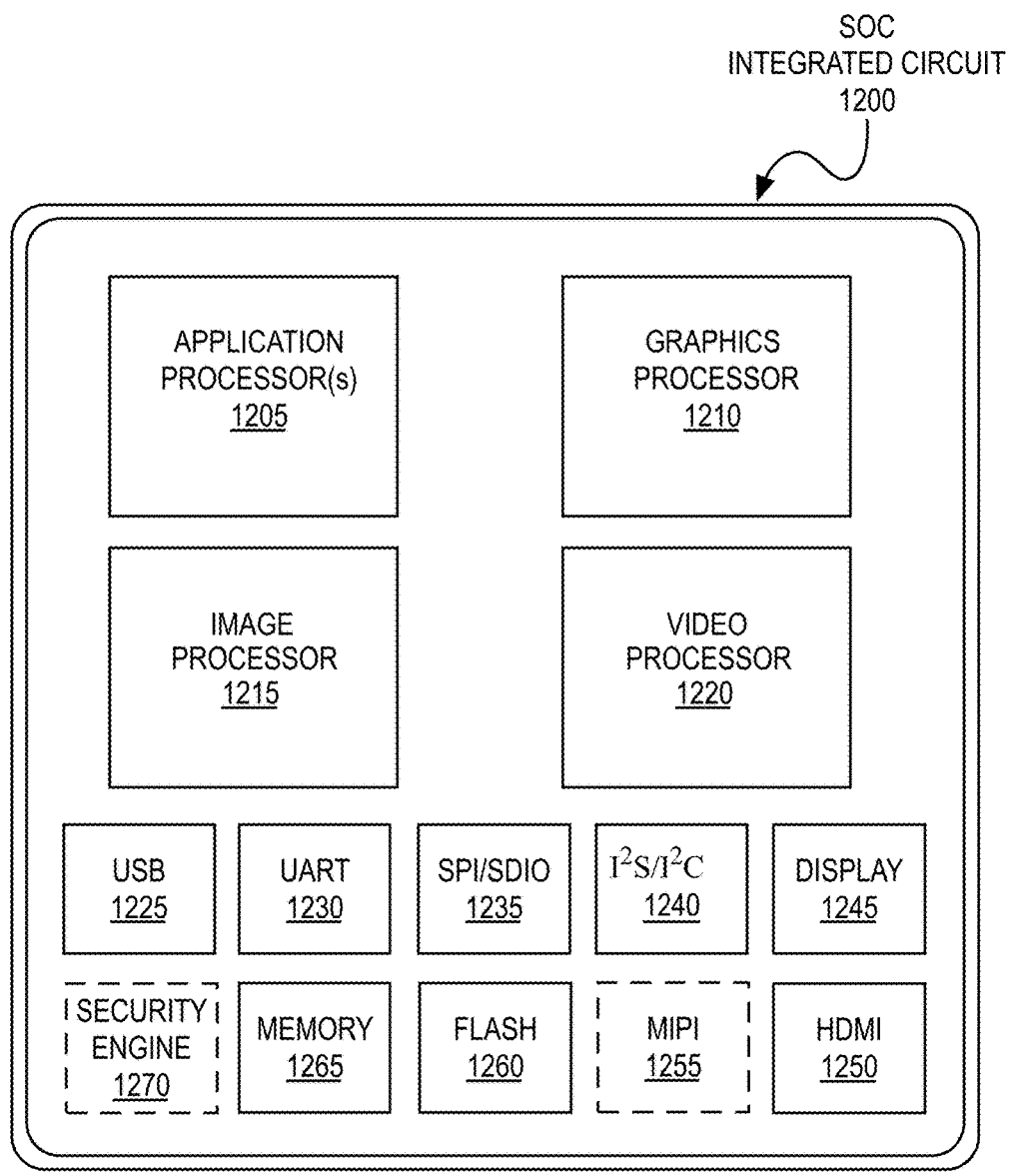
FIG. 12 illustrates an exemplary system on a chip integrated circuit that may be fabricated using one or more IP cores, according to an embodiment.
Figure 13:
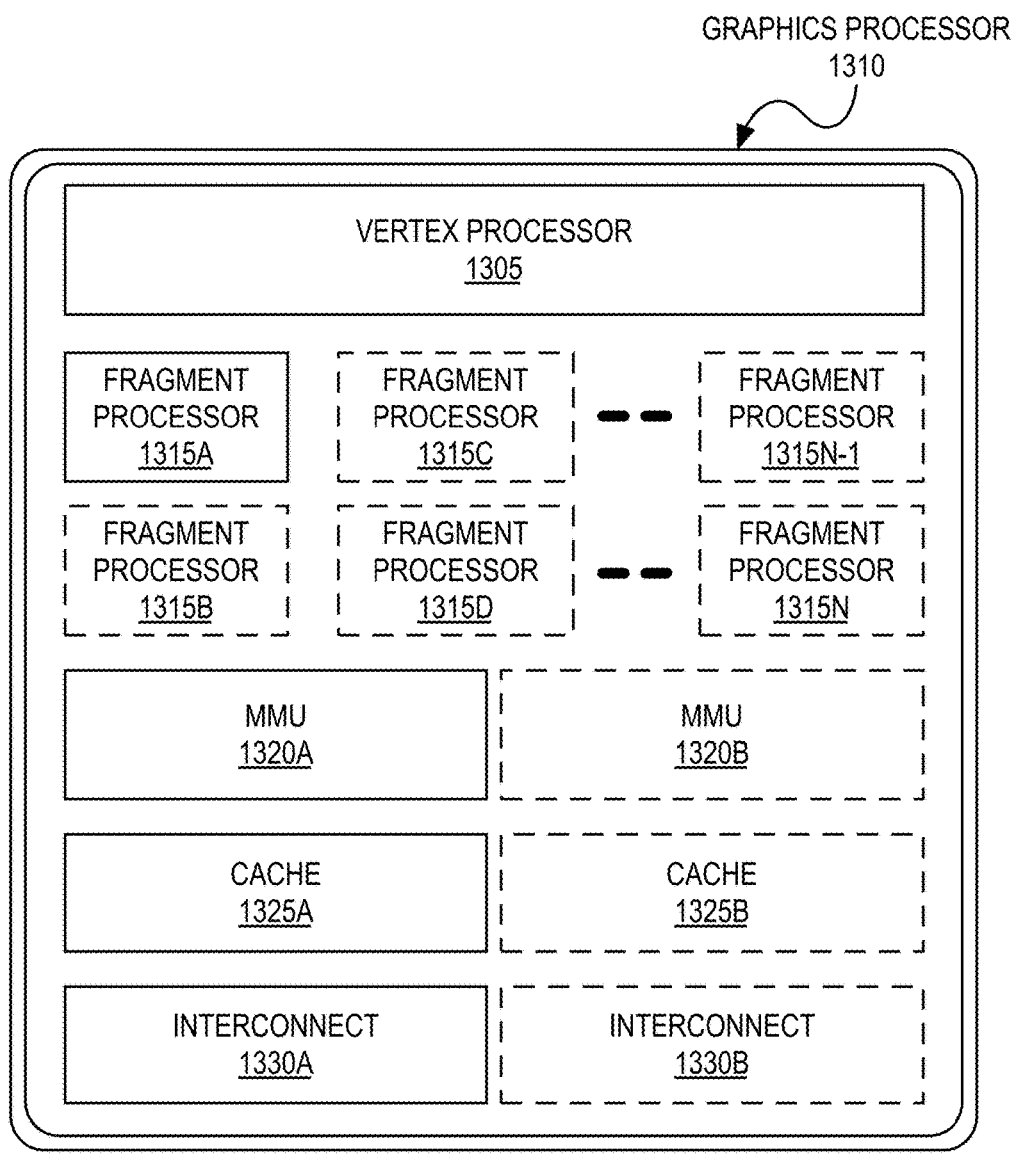
FIG. 13 illustrates an exemplary graphics processor of a system on a chip integrated circuit that may be fabricated using one or more IP cores.
Figure 14:
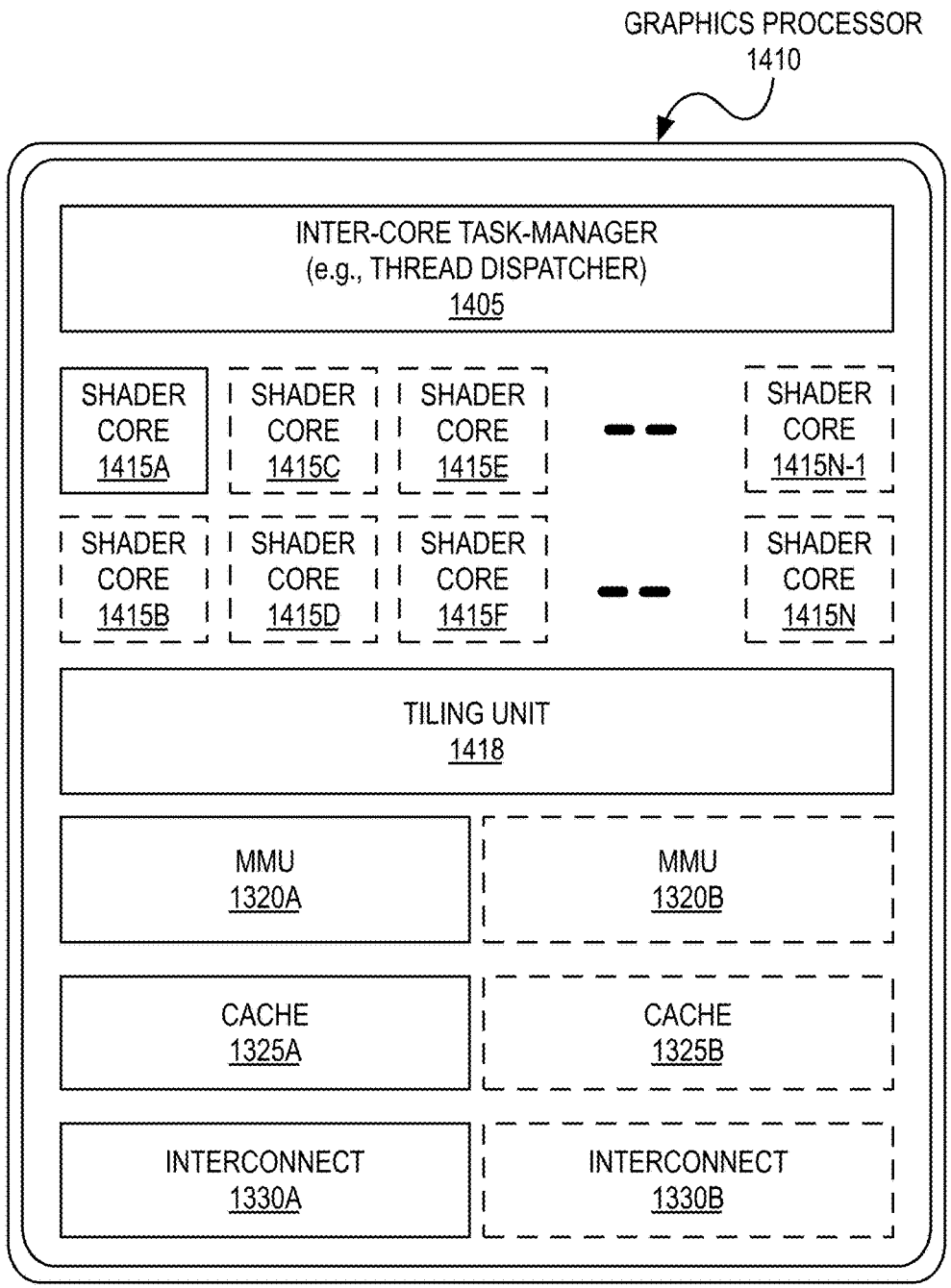
FIG. 14 illustrates an additional exemplary graphics processor of a system on a chip integrated circuit that may be fabricated using one or more IP cores

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N and a tiling unit 1418 to accelerate tiling operations for tile-based rendering, in which rendering operations for a scene are subdivided in image space, for example to exploit local spatial coherence within a scene or to optimize use of internal caches.

Augmented Reality/Virtual Reality Apparatus and Method

A. Overview

Figure 15A:
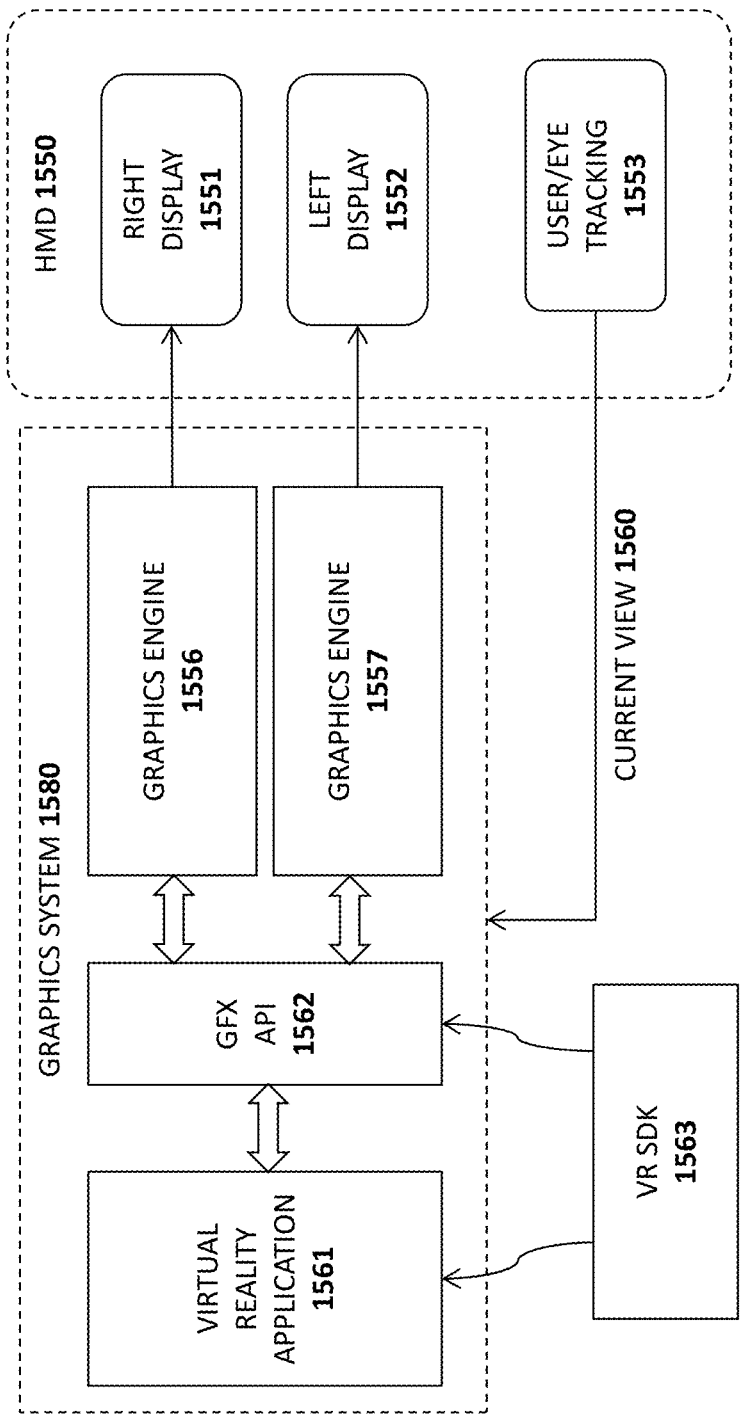
FIGS. 15A-C illustrate different embodiments of the invention having multiple graphics engines/pipelines.

Embodiments of the invention may be implemented within a virtual reality system such as that illustrated in FIG. 15A which includes a graphics system component 1580 and a head-mounted display (HMD) 1550. In one embodiment, the HMD 1550 comprises a right display 1551 on which images frames are rendered for viewing by the user's right eye and a left display 1552 on which image frames are rendered for viewing by the user's left eye. Separate graphics engines, 1556 and 1557, include graphics processing pipelines for rendering the right and left image frames, respectively, in response to the execution of a particular virtual reality application 1561. Each of the graphics engines 1556-1557 may comprise a separate graphics processing unit (GPU). Alternatively, the graphics engines 1556-1557 may include different sets of graphics execution resources within a single GPU or spread across multiple GPUs. For example, in a virtualized environment, a separate virtual GPU (vGPU) may be allocated to each display 1551-1552. Regardless of how the GPU resources are partitioned, the graphics engines 1556-1557 may implement any of the graphics processing techniques described herein.

In one embodiment, a user/eye tracking device 1553 integrated on the HMD 1550 includes sensors to detect the current orientation of the user's head and the direction of the user's gaze. For example, the orientation of the user's head may be captured using optical sensors and accelerometers while the current direction of the user's gaze may be captured with optical eye tracking devices such as cameras. As illustrated, the user/eye tracking device 1553 provide the user's current view 1560 to the graphics system 1580, which then adjust graphics processing accordingly (i.e., to ensure that the current image frames being rendered are from the current perspective of the user).

In one embodiment, the virtual reality application 1561 utilizes a graphics application programming interface (API) 1562 to implement features of the graphics engines 1556-1557 as described herein. For example, the graphics API 1562 may be provided with a virtual reality software development kit (SDK) 1563 which a developer may use to generate application program code for the virtual reality application 1561. For example, the virtual reality SDK 1563 may include a compiler (and/or other design tools) to generate object code for the virtual reality application 1561 which uses the API 1562 (e.g., by making calls to functions/commands included in the API). One or more of the techniques described herein may be implemented using the graphics API 1562, hardware within the graphics engines 1556-1557, and/or a combination thereof.

Figure 15B:
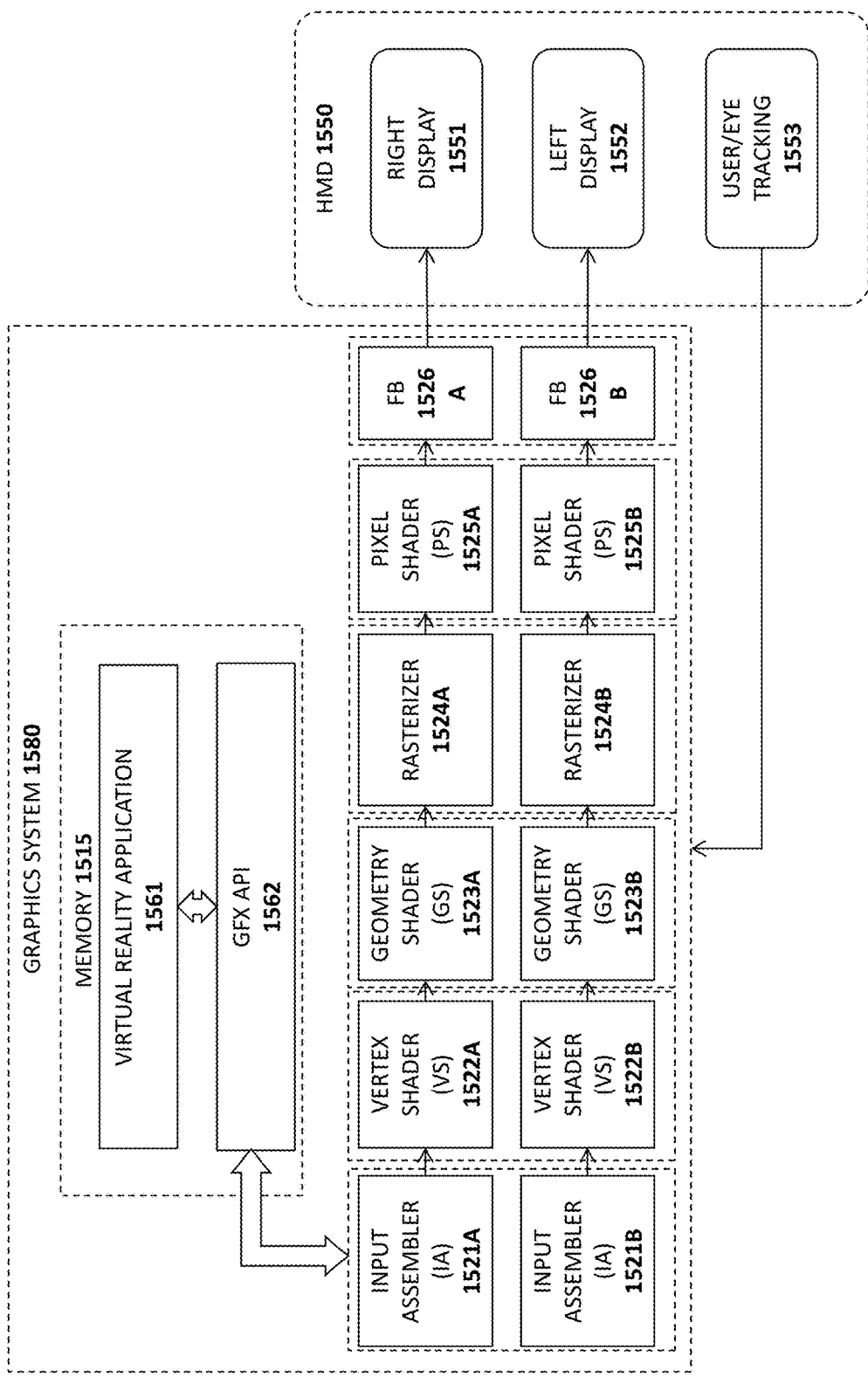

FIG. 15B illustrates the various stages of the two graphics pipelines for the right and left displays 1551-1552 in accordance with one embodiment. In particular, rasterization-based pipelines are illustrated including an input assembler (IA) 1521A-B which reads index and vertex data and a vertex shader (VS) 1522A-B from memory 1515. As mentioned, commands may be received by the IA 1521A-B via the graphics API 1562. The vertex shader 1522A-B performs shading operations on each vertex (e.g., transforming each vertex's 3D position in virtual space to the 2D coordinate at which it appears on the screen) and generates results in the form of primitives (e.g., triangles). A geometry shader (GS) 1523A-B takes a whole primitive as input, possibly with adjacency information. For example, when operating on triangles, the three vertices are the geometry shader's input. The geometry shader 1523A-B can then emit zero or more primitives, which are rasterized at a rasterization stage 1524A-B and the resulting fragments ultimately passed to a pixel shader (PS) 1525A-B, which performs shading operations on each of the individual pixels which are stored, frame by frame, within a frame buffer 1526A-B prior to being displayed on the HMD.

Figure 15C:
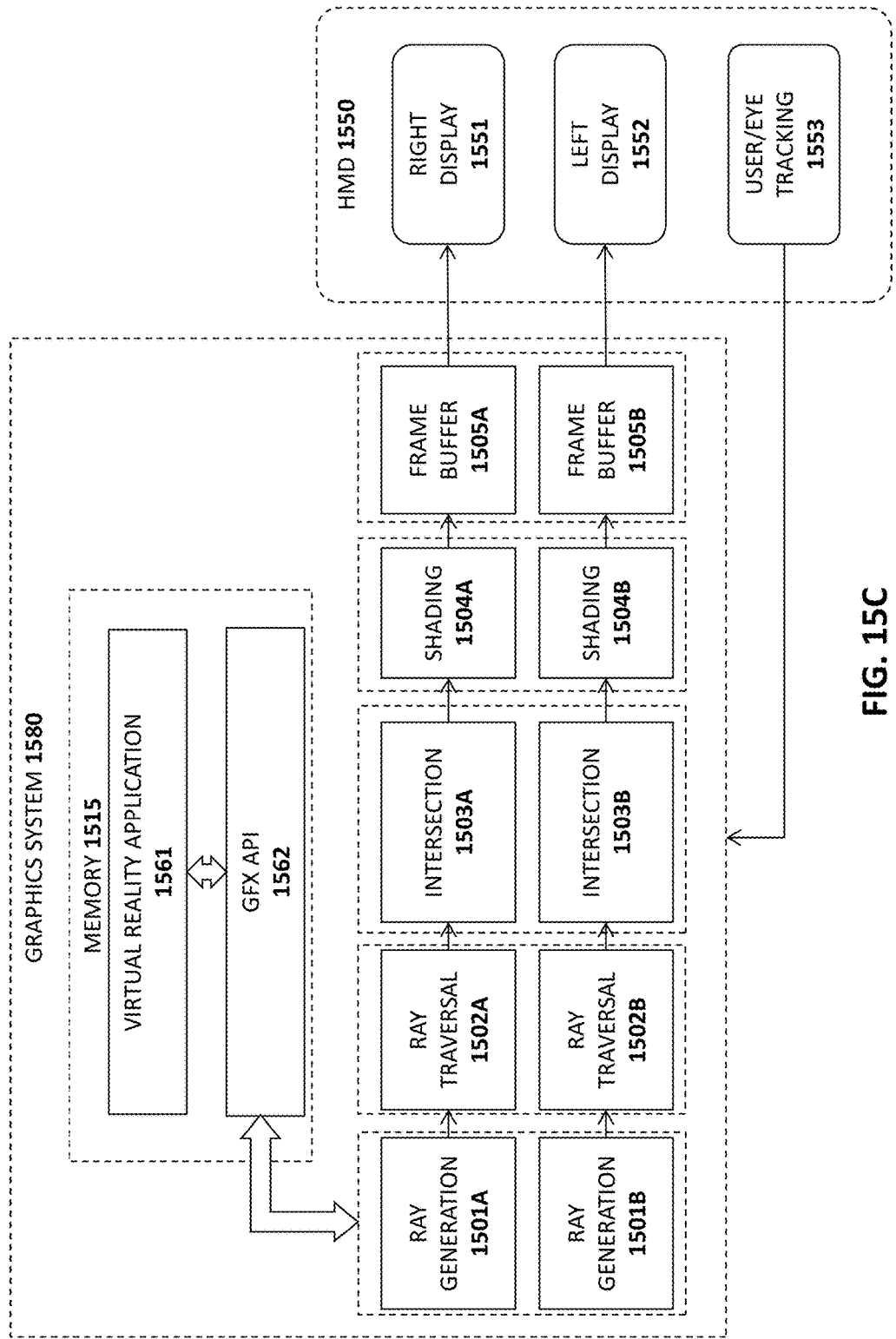

In one embodiment, a global illumination graphics processing architecture such as a ray tracing architecture may be employed. FIG. 15C, for example, illustrates an exemplary ray tracing-based graphics pipeline 1500 in which one or more pipeline stages 1501A-B to 1505A-B perform ray-tracing based rendering for the left and right displays 1551-1552. The illustrated stages include a ray generation module 1501A-B which generates rays for processing. For example, one embodiment performs breadth-first ray tracing per image tile, where a tile denotes a small fixed-size rectangular region. In one embodiment of a breadth-first implementation, one ray per pixel is generated for each iteration on the image tile. A ray traversal module 1502A-B traverses each ray against a bounding volume hierarchy (BVH) or other acceleration data structure. One or more intersection modules 1503A-B test the ray against one or more triangles or other primitives, and in the end, the traversal and intersection units must find the closest primitive that each ray intersects. One or more shader units 1504A-B then perform shading operations on the resulting pixels which are stored, frame by frame, within a frame buffer 1505A-B prior to being displayed on the HMD 1550.

B. Foveated Rendering

Figure 16:
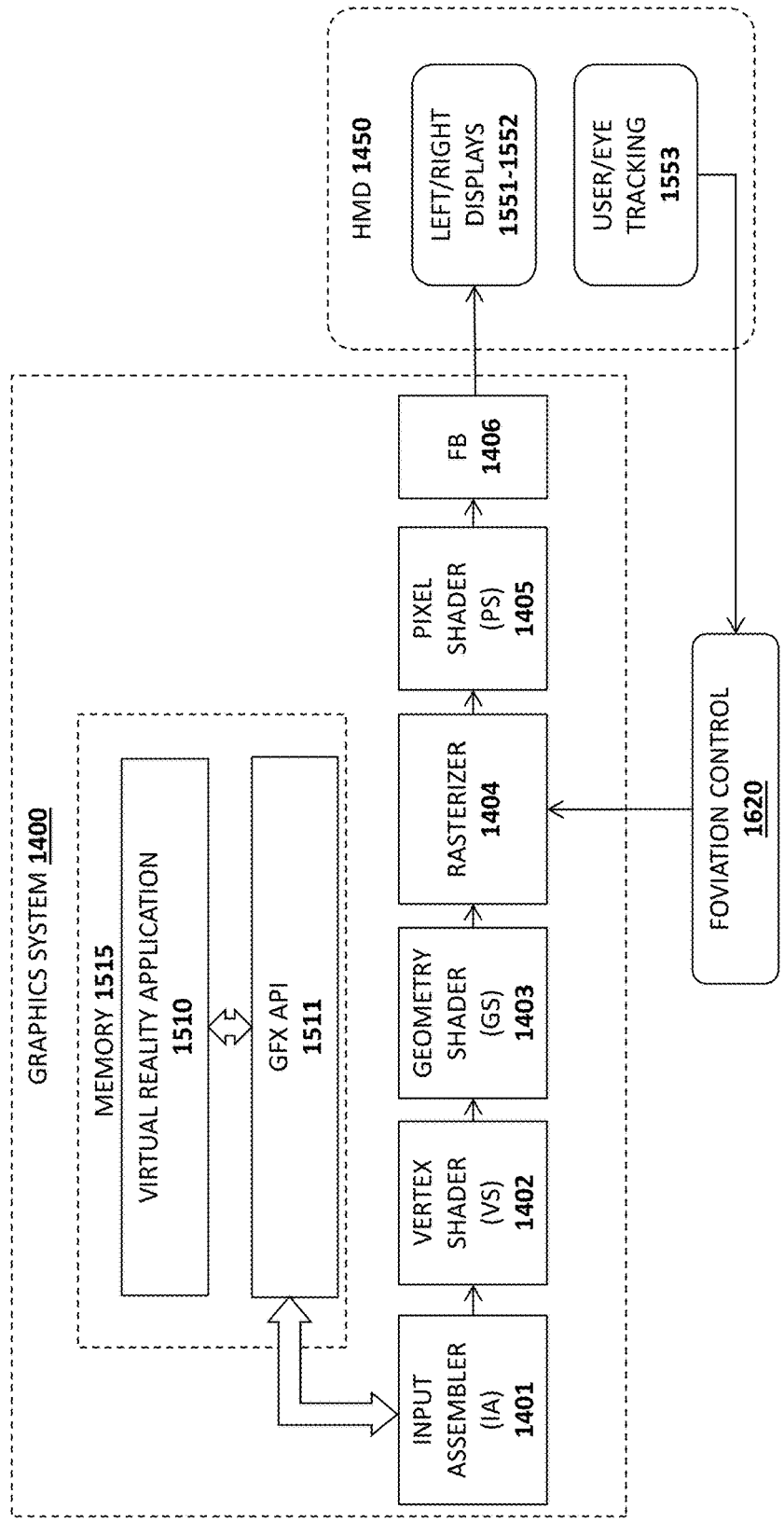
FIG. 16 illustrates one embodiment which performs foviation control over one or more pipeline stages.

One embodiment of the invention employs foveated rendering, a digital image processing technique in which the image resolution, or amount of detail, varies across the image in accordance with one or more "fixation points." A fixation point indicates the highest resolution region of the image and corresponds to the fovea, the center of the eye's retina. The location of a fixation point may be specified in different ways. For example, eye tracking devices which precisely measure the eye's position and movement are used to determine fixation points in virtual reality implementations. A higher resolution may be used in a region surrounding the fixation point than in other regions of the image. For example, as illustrated in FIG. 16, a foveation control module 1620 may control the rasterizer 1404 to use a higher sample or pixel density for the foveated area of the image.

C. Time Warping

Some embodiments of the invention may be employed in a VR system which uses time warping. Time warping is a technique used to improve performance in current virtual reality (VR) systems. According to this technique, each image frame is rendered in accordance with the current orientation of the user's head and/or eyes (i.e., as read from an eye tracking device and/or other sensors on the head mounted display (HMD) to detect the motion of the user's head). Just before displaying the next image frame, the sensor data is captured again and is used to transform the scene to fit the most recent sensor data (i.e., "warping" the current image frame). By taking advantage of the depth maps (i.e., Z Buffers) which have already been generated, time warping can move objects in 3D space with relatively low computational requirements.

One embodiment will be described with respect to FIG. 17 which illustrates a graphics processing engine 1300 communicatively coupled to a head-mounted display (HMD) 1350. A VR application 1310 is executed, generating graphics data and commands to be executed by the graphics processing engine 1300. The graphics processing engine 1300 may include one or more graphics processing units (GPUs) including a graphics pipeline to execute the graphics commands and render the image frames to be displayed on the HMD 1350 (e.g., such as the graphics pipelines described herein). For simplicity, only a single display 1717 is shown in FIG. 17, which may be the left and/or right display.

In operation, an image rendering module 1305 renders image frames to be displayed in the left and right displays 1717. In one embodiment, each image is rendered in accordance with a current orientation of the user's head and/or eyes, as provided by user/eye tracking module 1353 integrated on the HMD 1350. In particular, the HMD 1350 may include various sensors to track the current orientation of the user's head and cameras and associated circuitry/logic to track the current focus of the user's eyes. In a virtual reality implementation, this data is used to render left/right images from the correct perspective (i.e., based on the direction and focus of the user's current gaze).

Figure 17:
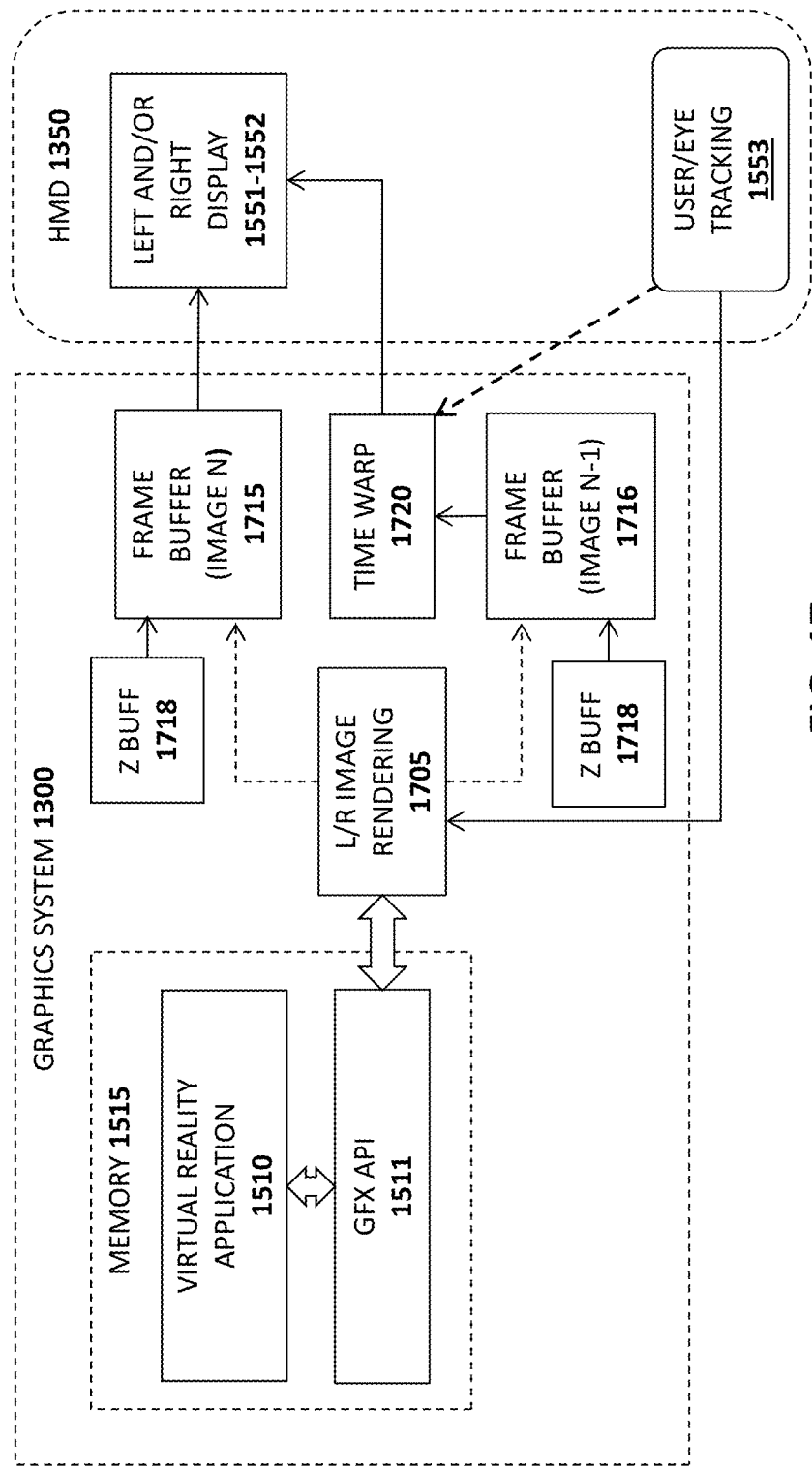
FIG. 17 illustrates time warping performed in accordance with one embodiment of the invention.

While illustrated as a single component in FIG. 17 for simplicity, separate image rendering circuitry and logic may be used for the left and right image frames. Moreover, various other graphics pipeline stages are not illustrated to avoid obscuring the underlying principles of the invention including, for example, a vertex shader, geometry shader, and texture mapper. A ray tracing architecture employed in one embodiment may include a ray generation module, a ray traversal module, an intersection module, and a shading module. In any implementation, the rendering module 1705 renders images for the left and right displays 1717 based on the current orientation/gaze of the user.

In the illustrated embodiment, a first frame buffer 1716 is storing an image frame N−1, currently displayed within the left/right display 1717 of the HMD. The next image frame to be displayed (image frame N) is then rendered within a second frame buffer 1715. In one embodiment, the image rendering module 1705 uses the coordinate data provided by the user/eye tracking module 1553 to render the next frame within frame buffer 1715. At the time the next frame needs to be displayed within the left and/or right display 1717, time warp module 1720 transforms image frame N−1 or image frame N (if rendering of image frame N is complete) to fit the most recent sensor data provided by user/eye tracking module 1553. This transformation is performed by the time warp module 1720 using the previously-generated depth maps stored in the processing engine's Z-buffers 1718. The transformation moves objects in 3D space with relatively small computational requirements, resulting in a more recently completed product without the need to re-render the scene. Thus, in most cases, it should be substantially similar to the image frame which would have been rendered if rendering had occurred more quickly.

D. Additional VR Embodiments

Figure 18:
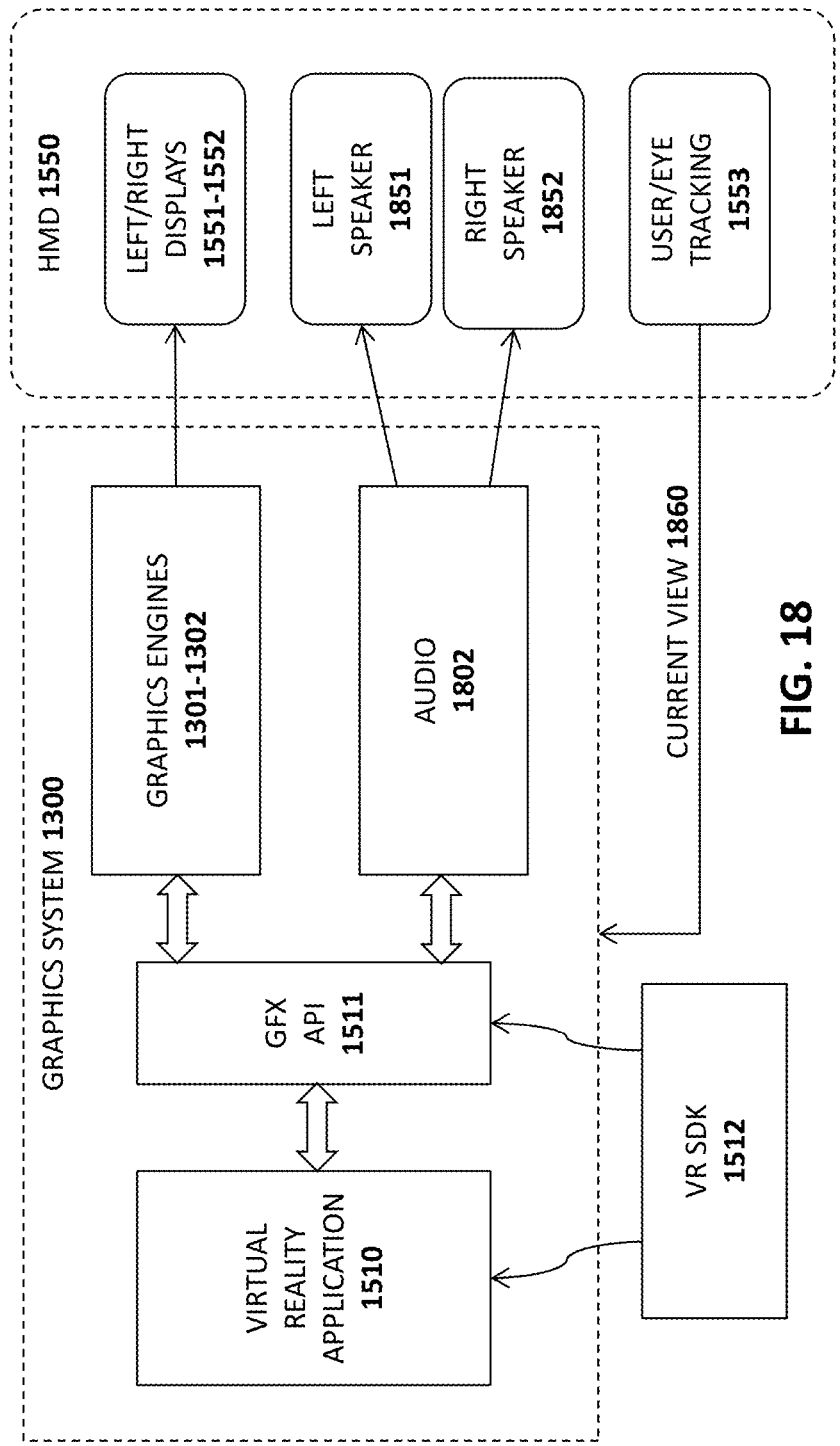
FIG. 18 illustrates audio processing in accordance with one embodiment of the invention.

As illustrated in FIG. 18, in one embodiment, audio processing logic 1802 produces left and right audio streams in response to the current view 1860. In particular, in one embodiment, the audio processing logic 1802 generates audio for a left speaker 1851 and a right speaker 1852 integrated on the HMD 1550 in accordance with the current orientation of the user's head within the virtual environment. For example, if a car passes to the left of the user, then the audio processing logic 1802 will cause the sound of the car to be more pronounced in the left speaker 1851 to produce a more realistic effect. The audio processing logic 1802 may implement various types of audio processing techniques including, by way of example and not limitation, Dolby Digital Cinema, Dolby 3D, DTS Headphone:X, and DTS Neo:PC, to name a few.

Figure 19:
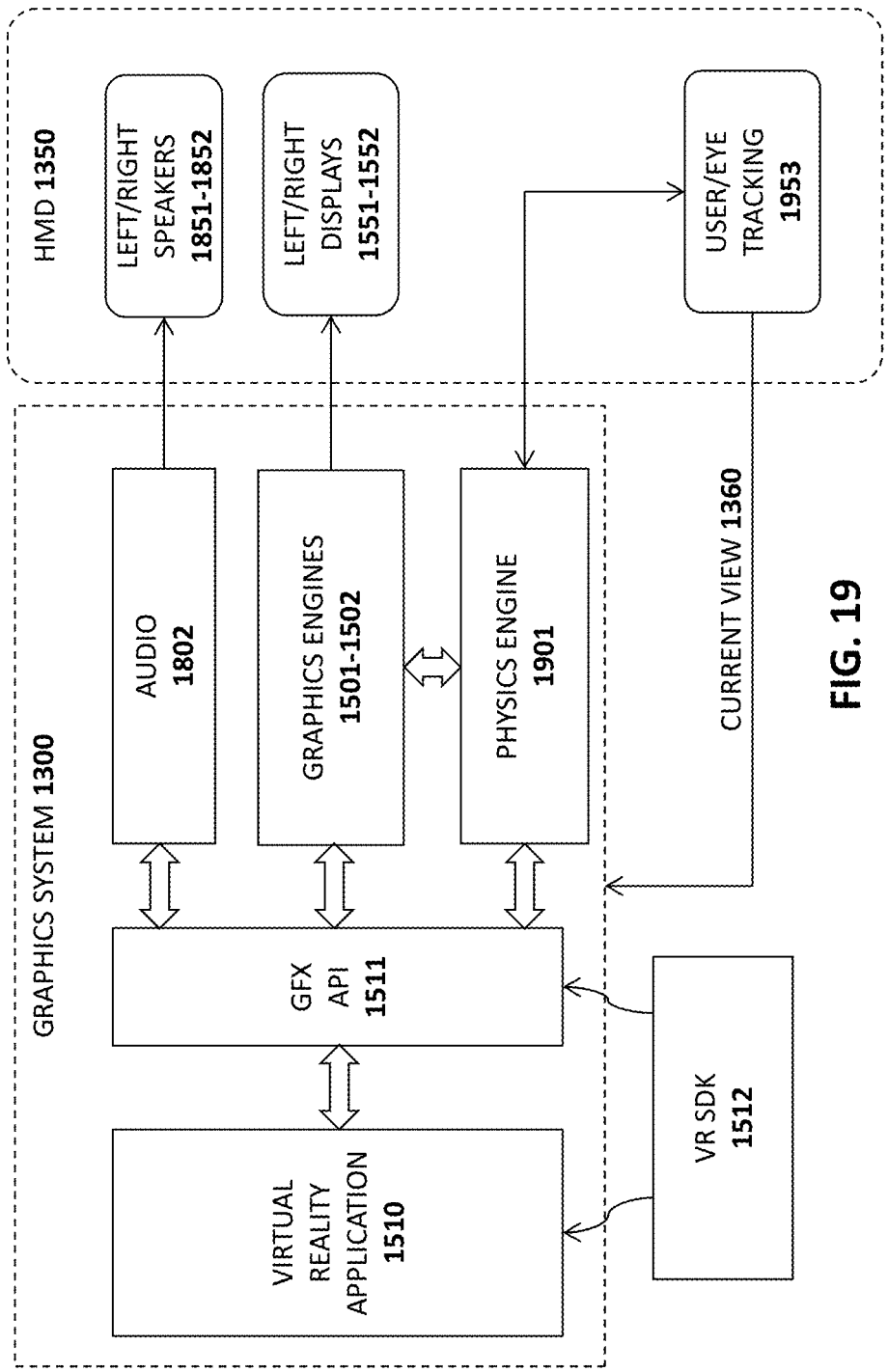
FIG. 19 illustrates a physics engine employed in one embodiment of the invention.

As illustrated in FIG. 19, one embodiment of the invention includes a physics engine 1901 to provide realistic modelling for touch interactions and haptic feedback. This may be accomplished through additional user tracking devices 1953 which may include, for example, touch interactivity using hand controllers, positional tracking, and haptics. One embodiment of the physics engine 1901 detects when a hand controller interacts with a virtual object and enables the graphics engines 1301-1302 and/or VR application 1310 to provide a physically-accurate visual and haptic response. The physics engine 1901 may also model the physical behavior of the virtual world to ensure that all interactions are accurate and behave as would be expected in the real world.

Figure 20:
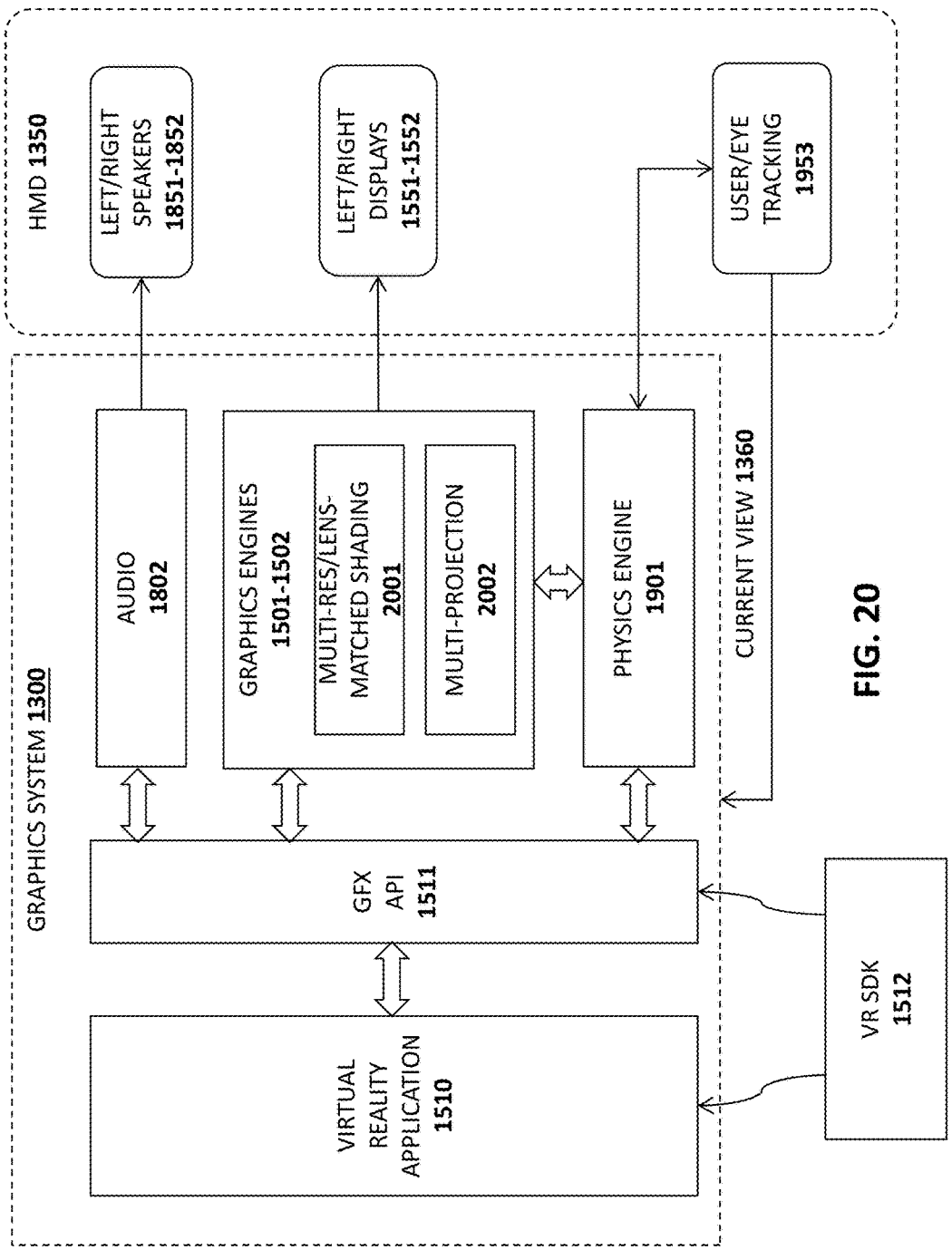
FIG. 20 illustrates one embodiment which includes lens-matched shading and multi-projection circuitry.

As illustrated in FIG. 20, embodiments of the invention may employ multi-resolution shading and/or lens-matched shading 2001 within the pixel shading stage of the graphics engine(s) 1501-1502. In one embodiment, multi-resolution shading is a rendering technique for virtual reality in which each part of an image is rendered at a resolution that better matches the pixel density of the lens corrected image. Dedicated GPU circuitry may be used which is capable of rendering multiple scaled viewports in a single pass. In one embodiment, lens-matched shading utilizes multi-projection hardware within the GPU to significantly improve pixel shading performance. In particular, this embodiment renders to a surface that more closely approximates the lens corrected image that is output to the left/right displays 1551-1552. This embodiment avoids rendering many pixels that would otherwise be discarded before the image is output to the HMD 1550.

In one embodiment, multi-projection circuitry 2002 includes a simultaneous multi-projection architecture which renders geometry only once and then simultaneously projects both right-eye and left-eye views of the geometry within the left/right displays 1551-1552. This architecture significantly reduces processing resources required in traditional virtual reality applications which draw geometry twice (i.e., once for the left eye, and once for the right eye). As a result, the geometric complexity of virtual reality applications is effectively doubled.

E. Server-Based VR Embodiments

One embodiment of the invention comprises a distributed virtual reality (VR) architecture in which a high power server or "compute cluster" is coupled to a VR render node over a network. In one embodiment, the compute cluster performs all of the graphics processing using, for example, a ray tracing graphics pipeline which generates image frames, compresses the image frames, and then transmits the compressed image frames to the render node for decompression and display. In one embodiment, the compute cluster executes a graphics application and generates samples using global illumination techniques such as ray tracing. It then streams the samples to a render node over a network. In one embodiment, the compute cluster determines the samples to be generated/streamed based on an expected viewpoint provided by the render node, which has a GPU for performing light field rendering and is coupled to a VR display such as a head mounted display (HMD). The compute cluster continually generates the stream of samples which are stored within a buffer on the render node. The GPU of the render node consumes the samples from the buffer to render the light field for the VR display.

Figure 21:
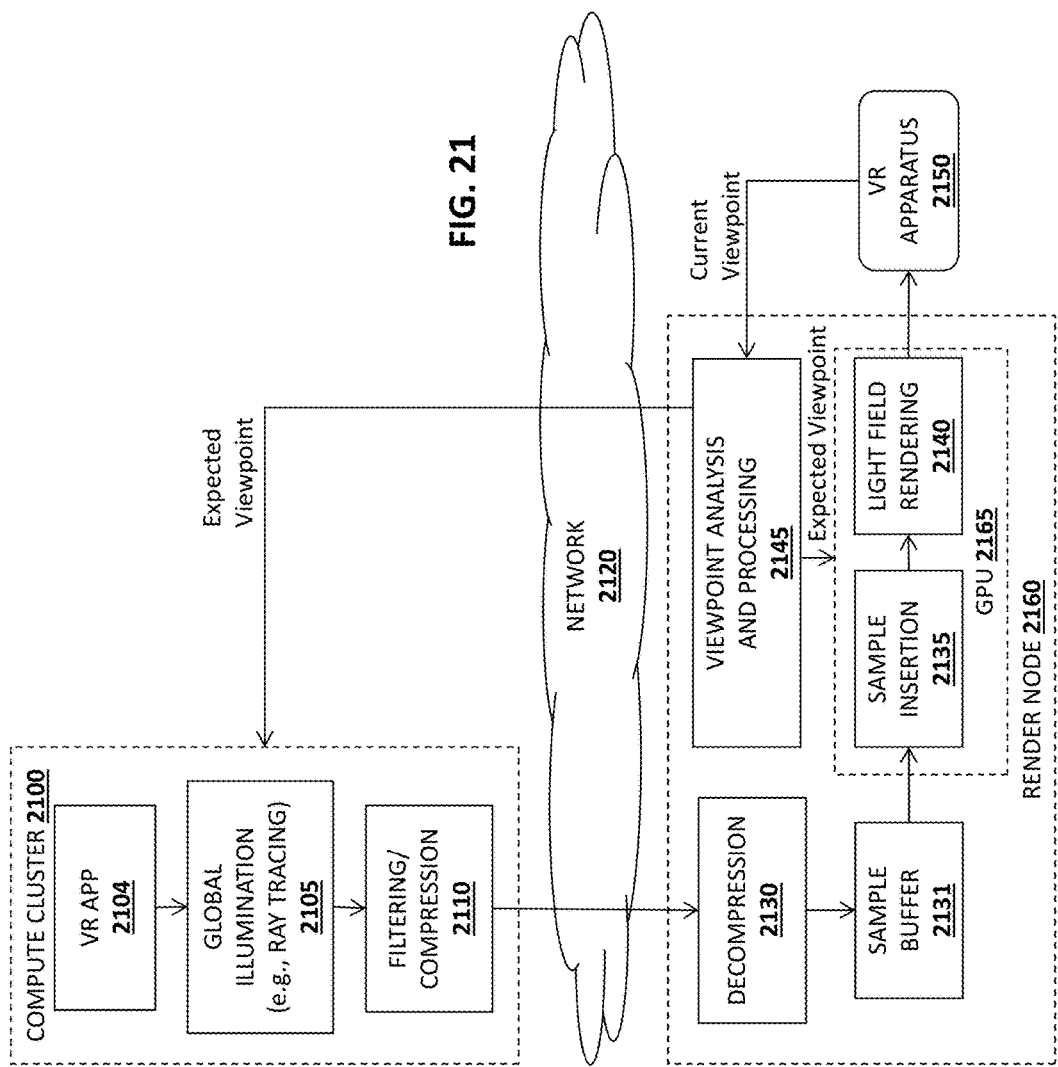
FIG. 21 illustrates one embodiment of a distributed virtual reality implementation.

FIG. 21 illustrates an exemplary compute cluster 2100 communicatively coupled to a render node 2160 over a network 2120. In one embodiment, the compute cluster 2100 includes high-performance graphics processing resources for executing global illumination/ray tracing operations to generate samples (e.g. GPUs, CPUs, memory, execution units, etc) which are then used by the render node 2160 to perform light field rendering on a virtual reality apparatus 2150 (such as a HMD). In particular, in the illustrated embodiment, the compute cluster 2100 includes global illumination/ray tracing circuitry and/or logic 2105 (hereinafter "GI module 2105") for performing global illumination/ray tracing operations in response to a virtual reality application 2104. A stream of samples are generated by the GI module 2105 which may then be filtered and/or compressed by filtering/compression module 2110. The filtered/compressed samples are then streamed via a network interface to the render node 2160 over a network 2120, which may be any form of data communication network (e.g., a public network such as the Internet or a private local area network or wide area network, or a combination of different network types).

If the samples were compressed prior to transmission, then they are decompressed by a decompression module 2130 on the render node 2160 before being stored in a sample buffer 2131. A GPU 2165 on the render node 2160 consumes the samples from the sample buffer 2131 to render the light field for image frames displayed on the VR display 2150. In particular, in one embodiment, sample insertion logic 2135 asynchronously inserts samples into the light field which is rendered by light field rendering logic 2140.

As illustrated in FIG. 21, in one embodiment, viewpoint analysis and processing logic 2145 receives an indication of the user's current viewpoint from the VR apparatus 2150 and (potentially in combination with prior stored viewpoint data), determines an "expected" viewpoint, which it provides to both the GPU 2165 on the render node 2160 and to the compute cluster 2100. As used herein, the "viewpoint" refers to the orientation of the user's gaze within the virtual reality environment (e.g., the direction in which the user is looking and/or focusing). The VR apparatus 2150 may use a variety of sensors to determine the user's viewpoint including, for example, eye tracking sensors to determine the location within each image frame at which the user's eyes are focused and motion sensors such as accelerometers to determine the orientation of the user's head/body. Various other/additional sensors may be used to determine the current viewpoint while still complying with the underlying principles of the invention.

The viewpoint analysis and processing logic 2145 determines the expected viewpoint based on a combination of the current viewpoint and prior viewpoints (e.g., determined from prior frames). For example, if the user's viewpoint has been moving in a rightward direction over the past N frames, then the expected viewpoint may be to the right of the current viewpoint (i.e., since change of viewpoint may be expected to continue in the same direction). The amount of change may be calculated based on the speed at which the viewpoint has been changing for the past frames. As such, the GI module 2105 may generate samples based on the expectation that the user's viewpoint may continue moving in the same direction. Thus, it will generate samples to cover portions of the image frame from this viewpoint as well as viewpoints surrounding this viewpoint (i.e., to ensure that the samples are available if the viewpoint does not continue linearly in the same direction). In a similar manner, the GPU 2165 may retrieve samples from the sample buffer 2131 based on the expected viewpoint, i.e., reading samples to cover the expected viewpoint along with samples surrounding the expected viewpoint.

In one embodiment, the compute cluster 2100 is implemented as a cloud-based virtualized graphics processing service with an array of graphics resources dynamically allocated to clients, such as render node 2160, upon demand. While only a single render node 2160 is illustrated in FIG. 21, many other render nodes may be concurrently connected to the compute cluster 2100, which may allocate graphics processing resources as needed to support each individual VR implementation. In one embodiment, the compute cluster supports a virtualized graphics processing environment in which a virtual machine is allocated to each requesting client. Graphics processing resources may then be allocated to the virtual machine based on the processing requirements of the client. For example, for high performance applications (such as VR), one or more full GPUs may be allocated to a client while for lower performance applications, a fraction of a GPU may be allocated to a client. It should be noted, however, that the underlying principles of the invention are not limited to any particular compute cluster architecture.

Figure 22:
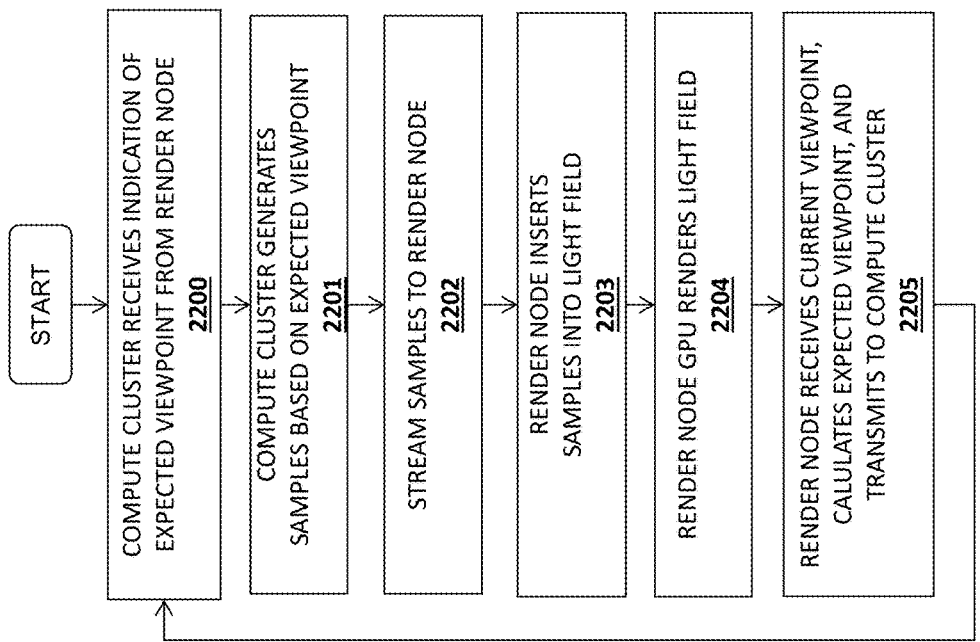
FIG. 22 illustrates a method in accordance with one embodiment of the invention.

A method in accordance with one embodiment is illustrated in FIG. 22. The method may be implemented within the context of the system architectures described above but is not limited to any particular system architecture.

At 2200, the compute cluster receives an indication of the expected viewpoint from the render node and, at 2201, generates samples based on the expected viewpoint. As mentioned, the samples may be generated in a specified region around the expected viewpoint to account for unexpected motion of the users head/eyes. At 2202 the compute cluster streams the samples to a sample buffer in the render node over a network (e.g., the Internet). At 2203, the render node reads samples from the sample buffer (e.g., based on the viewpoint or the expected viewpoint) and inserts the samples into the light field. At 2204, the render node GPU renders the light field using the samples. At 2205, the render node receives the current viewpoint, calculates the expected viewpoint, and transmits the expected viewpoint to the compute cluster.

The embodiments of the invention described herein may be used to implement a real time global illumination architecture such as a ray tracing architecture for virtual reality. Because the bulk of the computations are performed on the compute cluster 2200, the render node 2260 does not require the significant processing resources which would otherwise be required to perform ray tracing/global illumination. Rather, using these techniques, the GPU 2265 of the render node only requires sufficient power to perform light field rendering using pre-calculated samples stored in the sample buffer 2231.

F. Dynamically Adjustable VR Headset

In one embodiment of the invention, a linear actuator is coupled between the lens and the video display of a virtual reality apparatus such as a head-mounted display (HMD). The linear actuator is used to alter the distance between the display surface and the lens, thereby adjusting the accommodation distance, allowing software to control the focus distance. In one embodiment, the desired accommodation distance is determined using eye tracking techniques. Tracking devices used to measure the focus of the user's eyes may be integrated into the HMD. If both eyes are tracked, vergence distance is computed and used as desired accommodation distance. If only one eye is tracked, a ray is traced in the gaze direction into the virtual scene to determine the surface at which the user is looking. The surface distance is then used as the desired accommodation distance.

Figure 23:
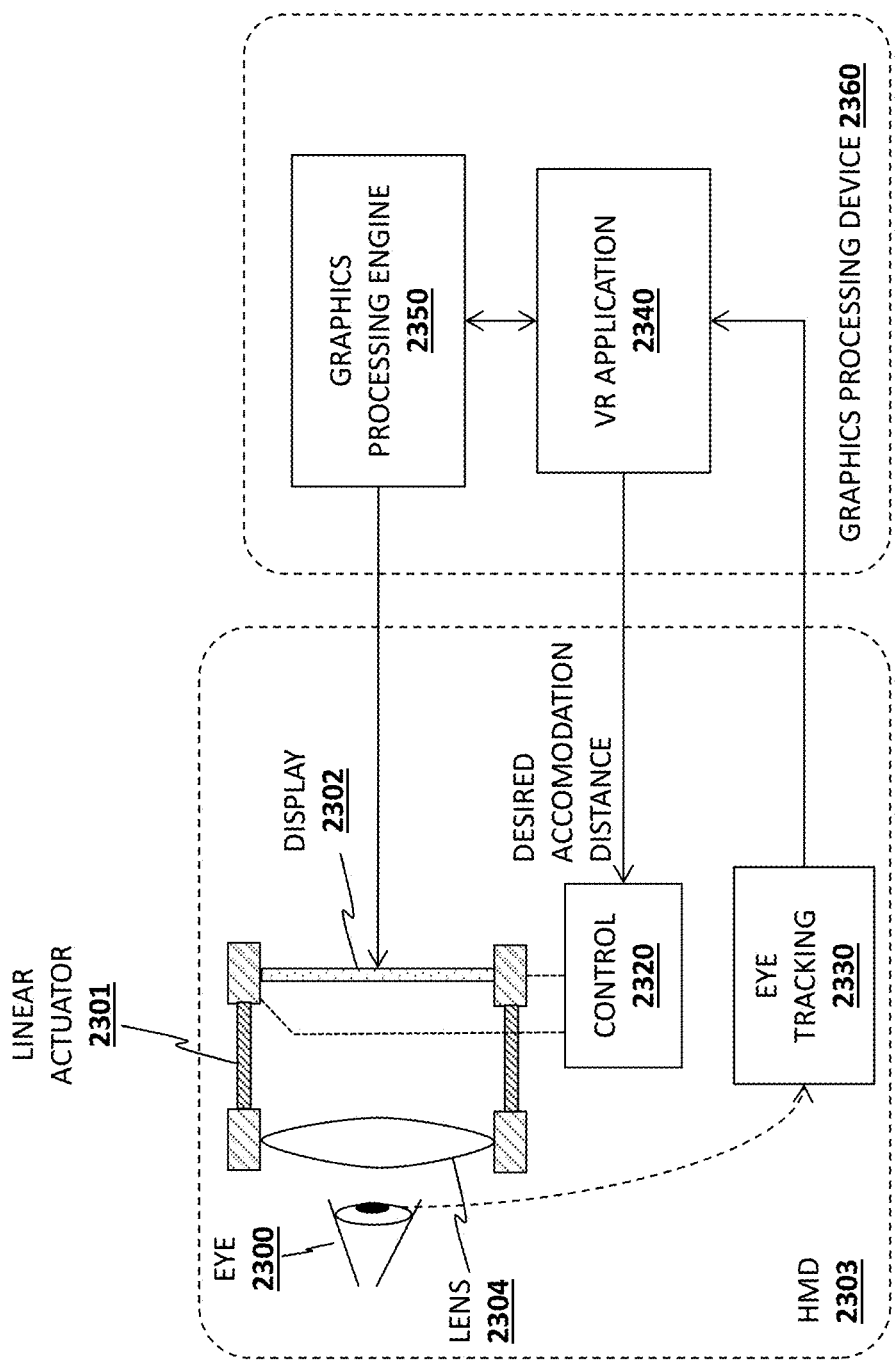
FIG. 23 illustrates one embodiment of the invention with an adjustable head mounted display.

FIG. 23 illustrates an exemplary embodiment of a HMD 2303 with a linear actuator 2301 coupled to a lens 2304 in the HMD display 2302 to adjust the position of the lens 2304 based on a desired accommodation distance. In one embodiment, an eye tracking device 2330 integrated on the HMD 2303 detects the current direction/focus of the user's eyes 2300 and provides this information to a virtual reality (VR) application 2340 executed on a graphics processing device 2560 to which the HMD is communicatively coupled. By way of example, the graphics processing device 2360 may be a computer system communicatively coupled to the HMD 2303 over a bi-directional communication interface. Alternatively, the graphics processing device 2360 may be integrated within the HMD.

The VR application 2340 may be any form of virtual reality application which utilizes a graphics processing engine 2350 to render image frames on the display 2302. In one embodiment, the graphics processing engine includes a graphics processing unit (GPU) for executing graphics commands generated by the VR application 2340 in response to user input. The user input may include motion data collected in response to movements of the user as well as input provided via game controller, keyboard, mouse or any other form of input device.

In one embodiment, the VR application 2340 uses the current direction/focus of the user's eyes provided by the eye tracking device 2330 to generate a desired accommodation distance. A control circuit 2520 on the HMD 2303 controls the linear actuator 2301 in the HMD to adjust the distance between the lens 2304 and display 2302 in accordance with the desired accommodation distance. As mentioned, if both of the user's eyes are tracked, the vergence distance is computed and used as the desired accommodation distance. If only one eye is tracked, a ray may be traced in the gaze direction into the virtual scene to determine the surface at which the user is looking. The surface distance is then used as the desired accommodation distance.

Figure 24:
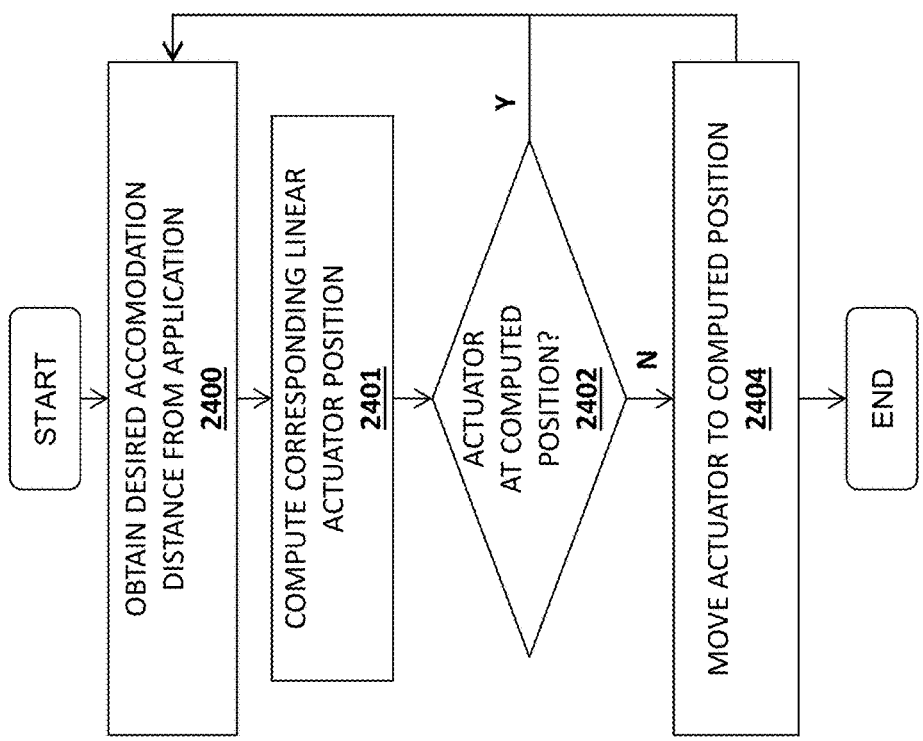
FIG. 24 illustrates a method in accordance with one embodiment of the invention.

A method in accordance with one embodiment of the invention is illustrated in FIG. 24. The method may be implemented within the context of the system architectures described above, but is not limited to any particular system architecture.

At 2400, the desired accommodation distance is obtained from the application. As mentioned, in the implementation described above, the accommodation distance may be determined by a VR application and provided to a control circuit on a HMD. At 2401, the linear actuator position is determined based on the desired accommodation distance. If the actuator is currently at the desired position, determined at 1402, then the process returns to 2400. If not, then the actuator is moved to the determined position at 2404.

Figure 25:
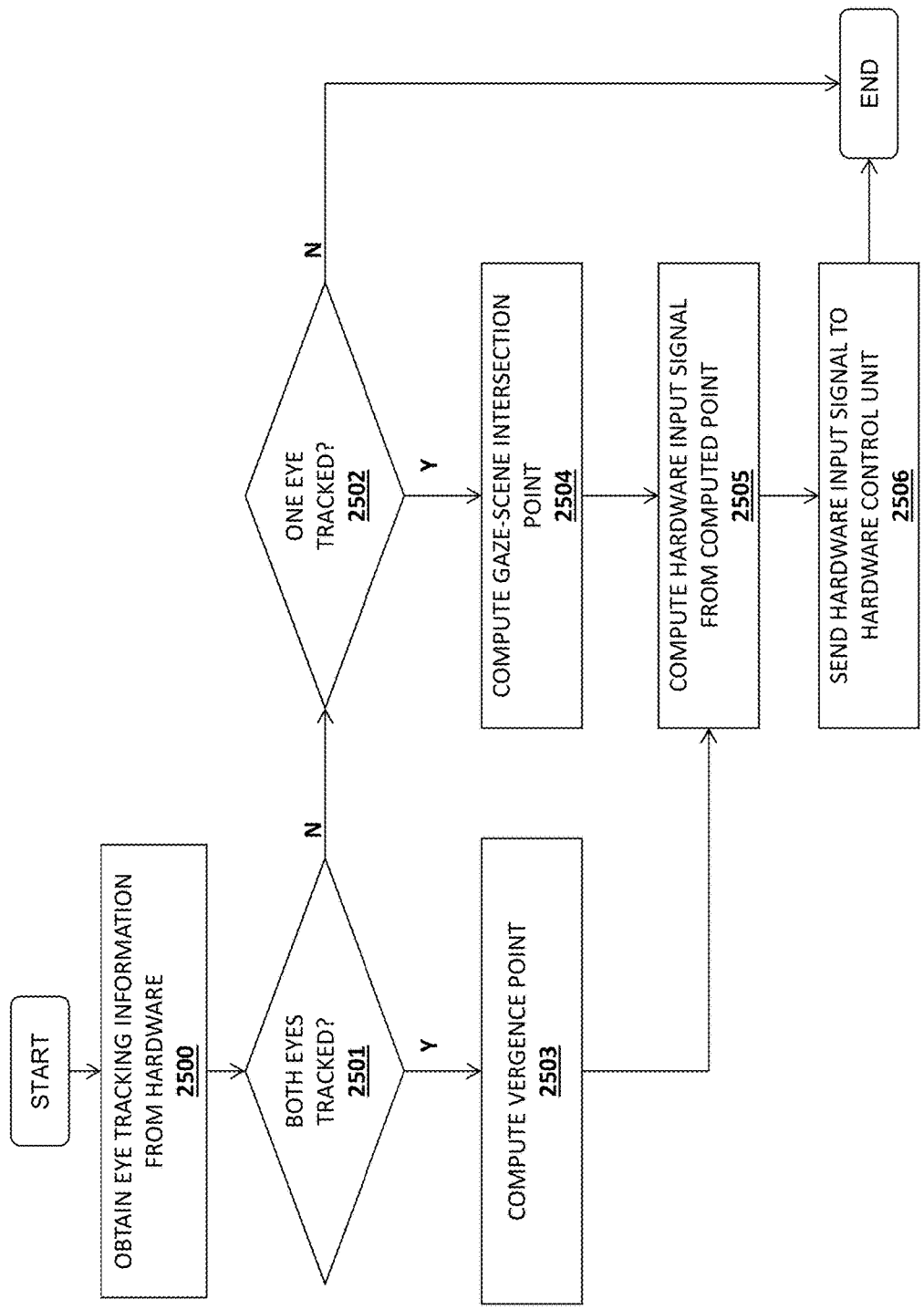
FIG. 25 illustrates another method in accordance with one embodiment of the invention.

FIG. 25 illustrates one embodiment of a method for dynamically adjusting accommodation distance which may be implemented by the VR application 2540 using information from eye tracking module 2530 and/or graphics processing engine 2550. It should be noted, however, that the method may be implemented in a variety of different hardware/software architectures.

Eye tracking information in 2500 is obtained from eye tracker 2530. If both eyes are tracked, determined at 2501, the vergence point is computed at 2503. In one embodiment, the vergence point is computed as the point at which the closest distance to the gaze rays originating from each eye is the smallest. If one eye is tracked, determined at 2502, then an intersection point is computed in 2504. In one embodiment, the intersection point is computed by ray-tracing a ray originating from the tracked eye, computing an intersection point with the virtual environment. In other embodiments, the depth buffer for the tracked eye can be read back from the GPU 2550, and the depth value of the pixel corresponding to the gaze direction of the tracked eye can be used to compute the gaze-scene intersection point. In some embodiments, the hardware input signal computed in 2505 can be the distance to the intersection point. In other embodiments, the point can be directly used as a hardware input signal, letting the hardware control unit perform any required processing. In still other embodiments, one or more actuator positions may be computed and used as the hardware input signal. The hardware input signal is transmitted to the hardware control unit 2520. In some embodiments, this transmission uses the USB protocol, but is not limited to any particular communication protocol.

G. Time Warping Implementations

Time warping is a technique used to improve performance in current virtual reality (VR) systems. According to this technique, each image frame is rendered in accordance with the current orientation of the user's head and/or eyes (i.e., as read from an eye tracking device and/or other sensors on the head mounted display (HMD) to detect the motion of the user's head). Just before displaying the next image frame, the sensor data is captured again and is used to transform the scene to fit the most recent sensor data (i.e., "warping" the current image frame). By taking advantage of the depth maps (i.e., Z Buffers) which have already been generated, time warping can move objects in 3D space with relatively low computational requirements.

One embodiment of the invention uses time warping techniques to warp a portion of a previously-rendered image frame and combining the results with the partially rendered current frame. For example, a currently-rendered frame may have a region of data which has been lost or corrupted due to transmission errors or other data processing errors. Similarly, the graphics rendering pipeline may have only been able to render a portion of the next image frame when it is time to display the image frame (e.g., given a required or specified frame rate for the VR system). In one embodiment of the invention, when a portion of a current image frame has not been rendered and/or has been lost/corrupted, the corresponding portion is read from the prior image frame which is then warped in accordance with the current sensor data. The warped portion of the prior image frame is then combined with the correctly-rendered portion of the current image frame and displayed on the VR display.

One embodiment will be described with respect to FIG. 26 which illustrates a graphics processing engine 2600 communicatively coupled to a head-mounted display (HMD) 2650. A VR application 2610 is executed, generating graphics data and commands to be executed by the graphics processing engine 2600. The graphics processing engine 2600 may include one or more graphics processing units (GPUs) including a graphics pipeline to execute the graphics commands and render the image frames to be displayed on the HMD 2650. In particular, the HMD may include a left display for displaying images for the user's left eye and a right display for displaying images for the user's right eye. For simplicity, only a single display 2640 is shown in FIG. 26, which may be the left or right display.

In operation, an image rendering module 2605 renders image frames to be displayed in the left and right displays

2640. In one embodiment, each image is rendered in accordance with a current orientation of the user's head and/or eyes, as provided by user/eye tracking module 2630 integrated on the HMD 2650. In particular, the HMD may include various sensors to track the current orientation of the user's head and cameras and associated circuitry/logic to track the current focus of the user's eyes. In a virtual reality implementation, this data is used to render left/right images from the correct perspective (i.e., based on the direction and focus of the user's current gaze).

Figure 26:
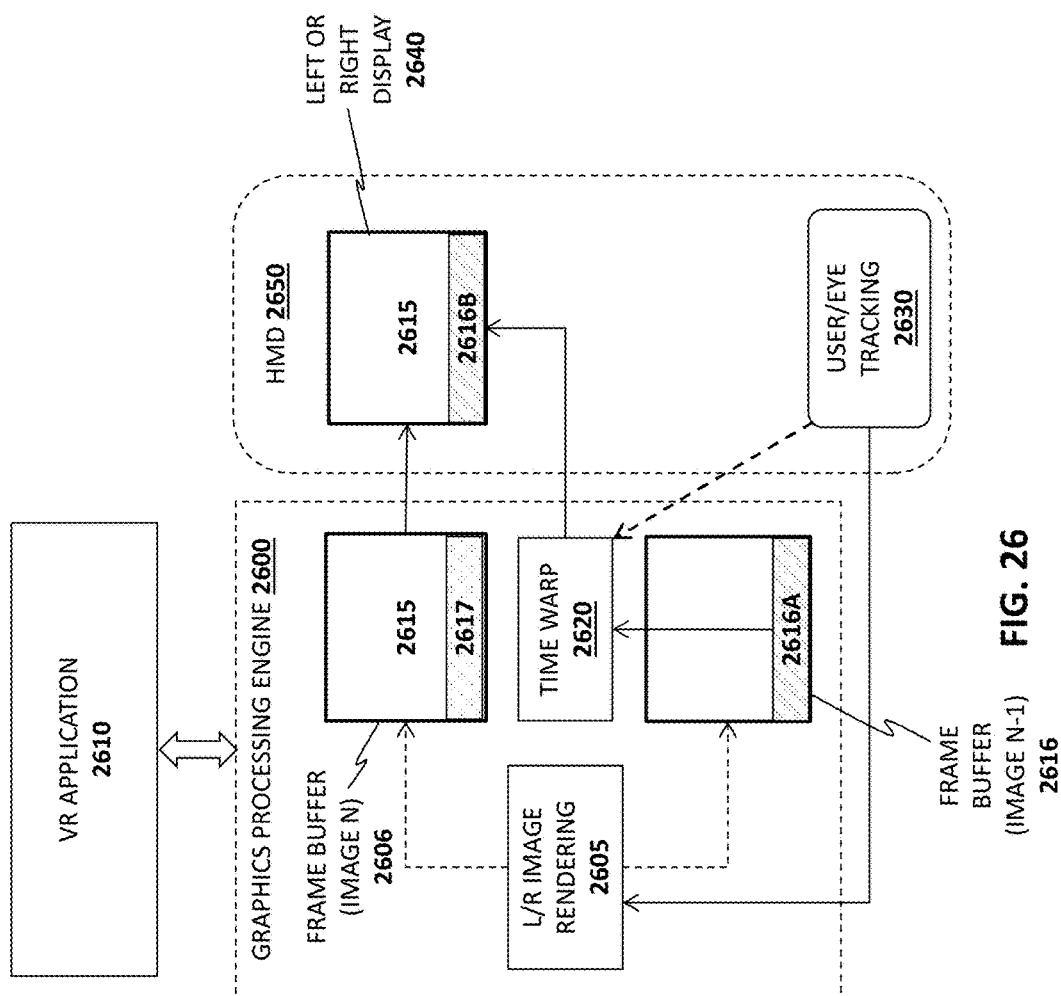
FIG. 26 illustrates one embodiment of an architecture for performing time warping.

While illustrated as a single component in FIG. 26 for simplicity, separate image rendering circuitry and logic may be used for the left and right image frames. Moreover, various other graphics pipeline stages are not illustrated to avoid obscuring the underlying principles of the invention including, for example, a vertex shader, geometry shader, and texture mapper. A ray tracing architecture employed in one embodiment may include a ray generation module, a ray traversal module, an intersection module, and a shading module. In any implementation, the rendering module 2605 renders images for the left and right displays 2640 based on the current orientation/gaze of the user.

In the illustrated embodiment, a first frame buffer 2616 is storing an image frame N−1, currently displayed within the left/right display 2640 of the HMD 2650. The next image frame to be displayed (image frame N) is being rendered within a second frame buffer 2606. In particular, a first portion 2615 of the image frame has been correctly rendered while a second portion 2617 is has not yet been rendered. As mentioned, portion 2617 may be corrupted due to a communication error or other form of error. Alternatively, image rendering module 2605 may not have rendered the full image quickly enough to meet the frame rate required by the HMD 2650.

In either case, in one embodiment, time warp module 2620 selects a corresponding portion 2616A of the image frame N−1 in frame buffer 2616, performs a time warp operation on the contents of the portion 2616A to generate a warped portion 2616B, which is then combined with the rendered portion of the image 2615 to arrive at the final image on the right/left display 2640. In particular, the time warp module 2620 reads the sensor data from the user/eye tracking module 2630 to transform the portion of the prior image 2616A to fit the most recent sensor data. This transformation is performed by the time warp module using the previously-generated depth maps stored in the processing engine's Z-buffers 2618. The transformation moves objects in 3D space with relatively small computational requirements, resulting in a more recently completed product without the need to re-render the scene. Thus, in most cases, it should be substantially similar to the portion 2617 which would have been generated if rendering had occurred correctly.

Figure 27:
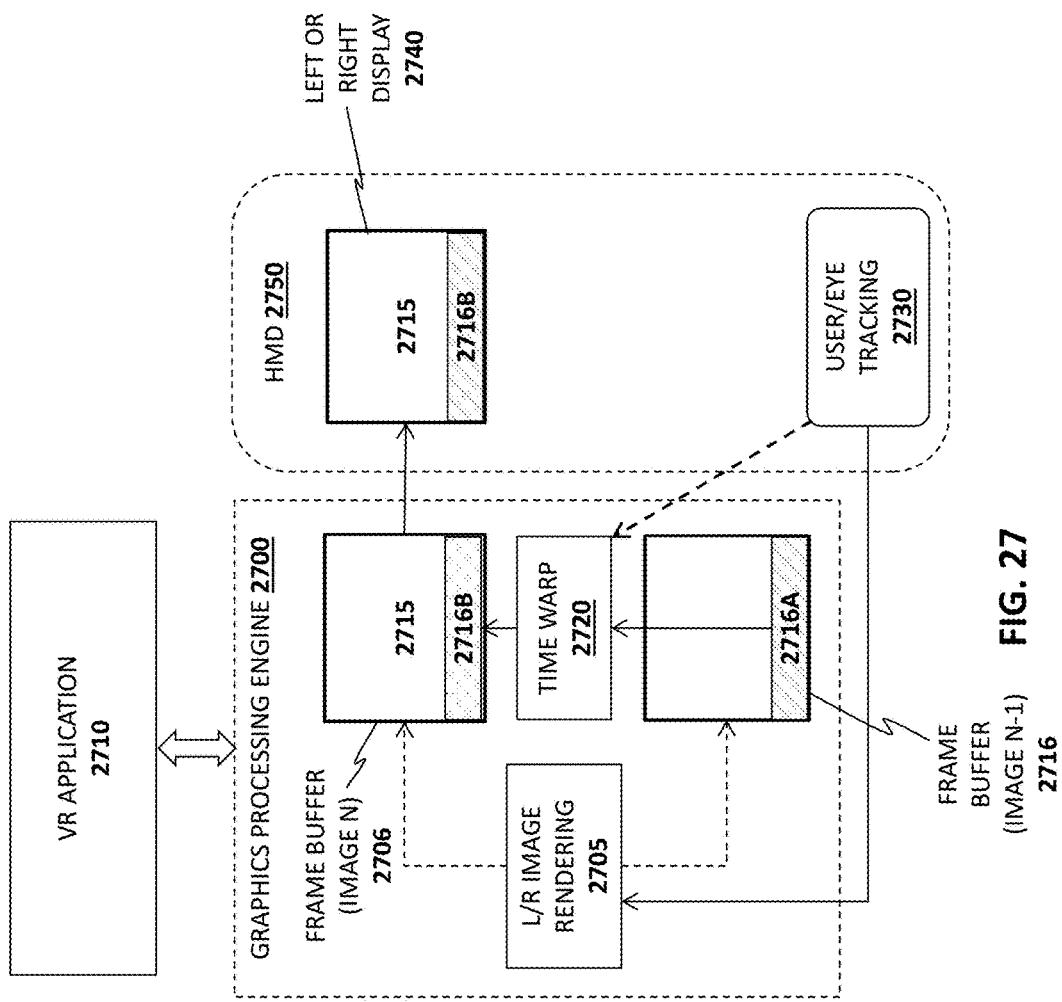
FIG. 27 illustrates another embodiment of an architecture for performing time warping.

As illustrated in FIG. 27, rather than transferring the warped portion 2816B directly to the left/right display 2840, one embodiment of the time warp module 2820 copies the image portion to the frame buffer 2806 from which the final image (2815+2816B) is read to the display 2840. The underlying principles of the invention are not limited to any particular technique for combining the warped portion of the prior image frame 2816B with the portion of the rendered frame 2815.

Figure 28:
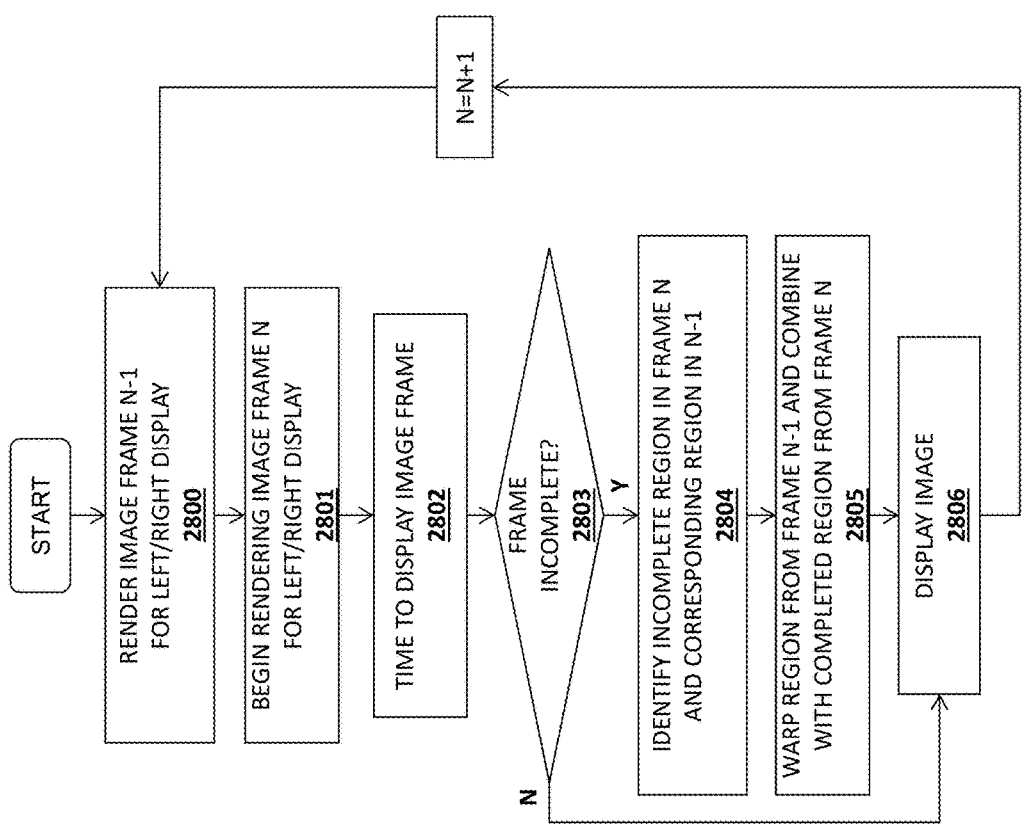
FIG. 28 illustrates a method in accordance with one embodiment of the invention.

A method in accordance with one embodiment of the invention is illustrated in FIG. 28. The method may be implemented within the context of the system architectures described above, but is not limited to any particular set of processing resources.

At 2800, image frame N−1 is rendered for the left/right display. At 2801, rendering begins for image frame N and at 2802, it is time to display image frame N. If image frame N is incomplete, determined at 2803, then at 2804 the incomplete region in image frame N and the corresponding region in image frame N−1 is identified. At 2805, the corresponding region in image frame N−1 is warped based on current coordinates provided by the HMD sensors and the warped results are combined with the completed region from frame N. The resulting image is displayed at 2806.

Time warp algorithms today render a much larger image than required. Time warp then samples this image based on the user's actual head position when each scan line is read out. This leads to scanlines being "sheared" which necessitates the larger draw area. One embodiment of the invention predicts which time warp will happen based on head motion, and concentrates rendering efforts into the predicted region of the frame. One embodiment renders the warped image with a ray tracer (adjusting the view position and direction per scan line). In one embodiment, a rasterizer uses a sheared projection matrix. Motion data, acceleration data, and data from other sensors may be exploited to predict the position and orientation of the user's head and eyes. In short, being able to predict the shearing effect that is going to happen during resampling means a smaller overdraw region can be used, and thus faster/cheaper rendering.

The basic rationale for the time warp algorithm is that a good VR experience requires extremely low latency between head motion and display of the pixels. In a head mounted display (HMD), however, frame buffers are not filled instantaneously, but scan line by scan line; thus, during fast head motion the actual head direction by the time a given scan line is read out may no longer correspond to the camera direction used when rendering the frame. The "time warp" algorithm accounts for that fact by rendering a single, larger frame at the beginning of each frame, sending that to the VR device, and have the HMD device sample this large, readily-rendered frame buffer, for each pixel (or scanline), using the respective head orientation at the time the scan line is read out. In practice, during fast head motion this means that the actual pixels (re-)sampled from the original frame buffer are "sheared" inside that frame buffer. In particular, to make sure that all sheared samples fall to valid pixels in that original image, the original image has to be significantly larger than the final number of samples, meaning that the original image has to spend time, power, and effort to compute pixels that will eventually never be accessed by any sample.

If, however, the likely sheared sample pattern that the HMD will actually access can be predicted, some of this "overdraw" can be avoided for faster and/or cheaper rendering. In one embodiment a sheared image is directly rendered, either using a sheared projection matrix (for a rasterizer) or using a properly sheared ray generation code (for a ray tracer). In another embodiment, a full frame is rendered (with a regular view matrix and full overdraw), but rendering quality is adjusted in the region of interest indicated by the projected shear. For example, in the extreme case, any pixel outside of the sheared region might get stenciled out completely; in a less extreme setting these pixels would still get rendered but at lower quality (lower render resolution, lower anti-aliasing settings, cheaper shader, etc).

Figure 29:
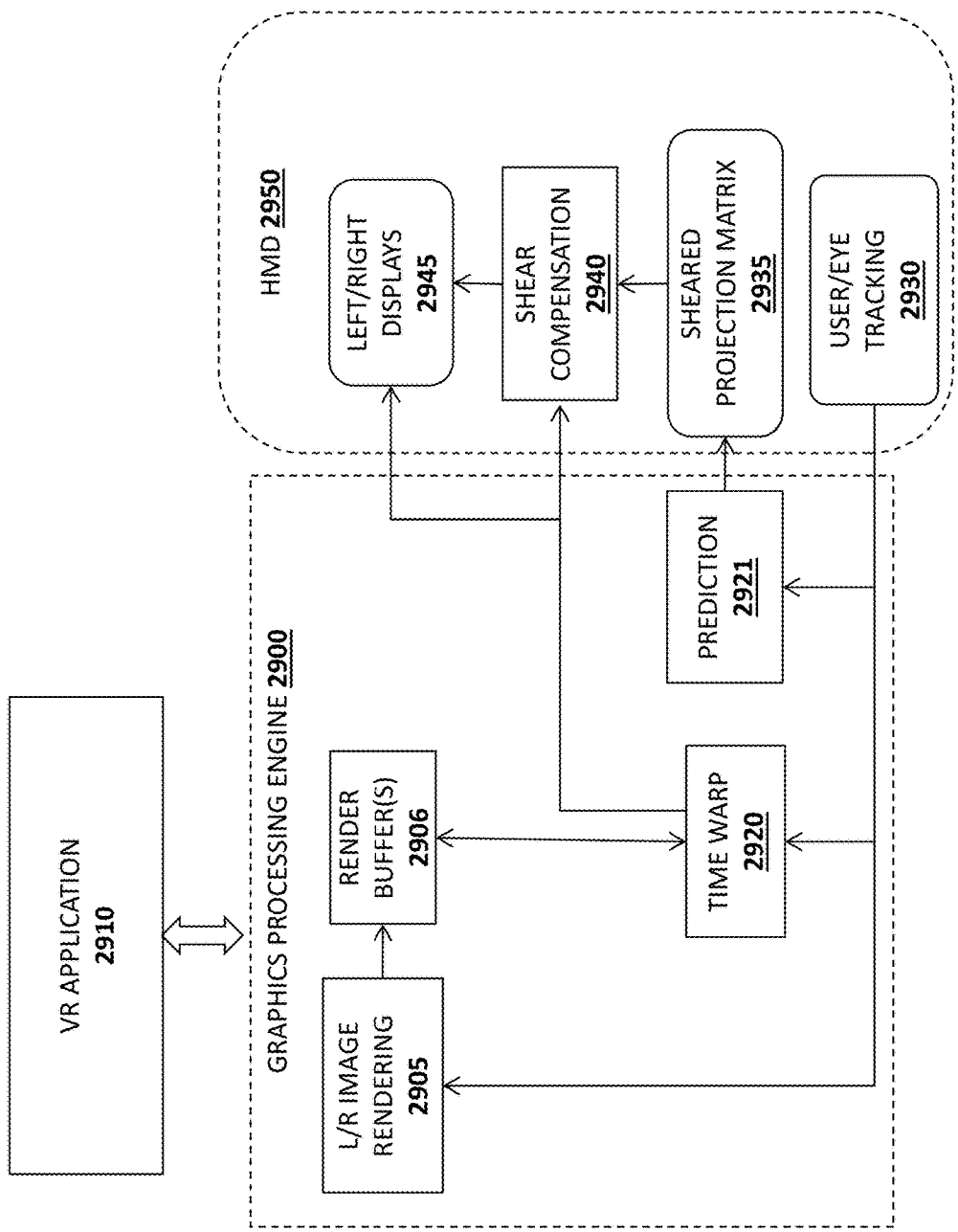
FIG. 29 illustrates one embodiment of a time warp apparatus in accordance with one embodiment.

FIG. 29 illustrates one embodiment in which a VR application is executed by a graphics processing engine 2900 equipped with a left/right image rendering pipeline 2905 which outputs rendered images into one or more render buffers 2906. As illustrated in FIG. 29, in the first of these embodiments (rendering a sheared input image), prediction logic 2921 generates a sheared projection matrix 2935 based on predicted motion of the user's eyes. The shearing matrix 2935 is passed to the HMD 2950 which includes shear compensation logic 2940 that accounts for this pre-shear by subtracting it from the actual shear required for the time warp algorithm 2920. The results are then displayed on the left/right displays 2945 of the HMD. In the second embodiment (changing render quality in the sheared region) this is not required.

For the method to work all is required is the proper motion and acceleration vectors to determine the camera positions at the time the first and last scan lines will be read out by the HMD. In the case of using a single sheared matrix we can then compute a shared projection matrix (using a single fixed camera origin) that covers this entire time interval; in the case of using a ray tracer we can actually compute both eye position and camera orientation for each scan line separately, even having a different camera origin per scan line.

Current augmented reality (AR) systems render separate image streams for a "real" image and one or more "virtual" images. The real image may be captured via a camera or optical lens included on a head mounted display (HMD) while the virtual images are rendered by a 3D graphics pipeline and combined with the real image to create the "augmented" reality.

H. Apparatus and Method for Utilizing a Control Surface to Combine Virtual and Real Content To reduce the graphics processing resources required to render virtual images, a control surface specified in metadata is used to indicate where virtual content is to be displayed (or not displayed) on a per-tile basis. For example, the metadata may mark a tile as fully transparent in which case, the graphics data associated with these tiles is not fetched and/or processed on the display to conserve processing resources, resulting in lower bandwidth and more efficient rendering. One embodiment of the AR system may also use the control surface to combine the virtual and real content. For example, an alpha value may be specified to indicate a level of transparency for each of the virtual tiles. Additional embodiments may utilize light field compression and may use high bandwidth memory to load/store the virtual graphics data.

Figure 30:
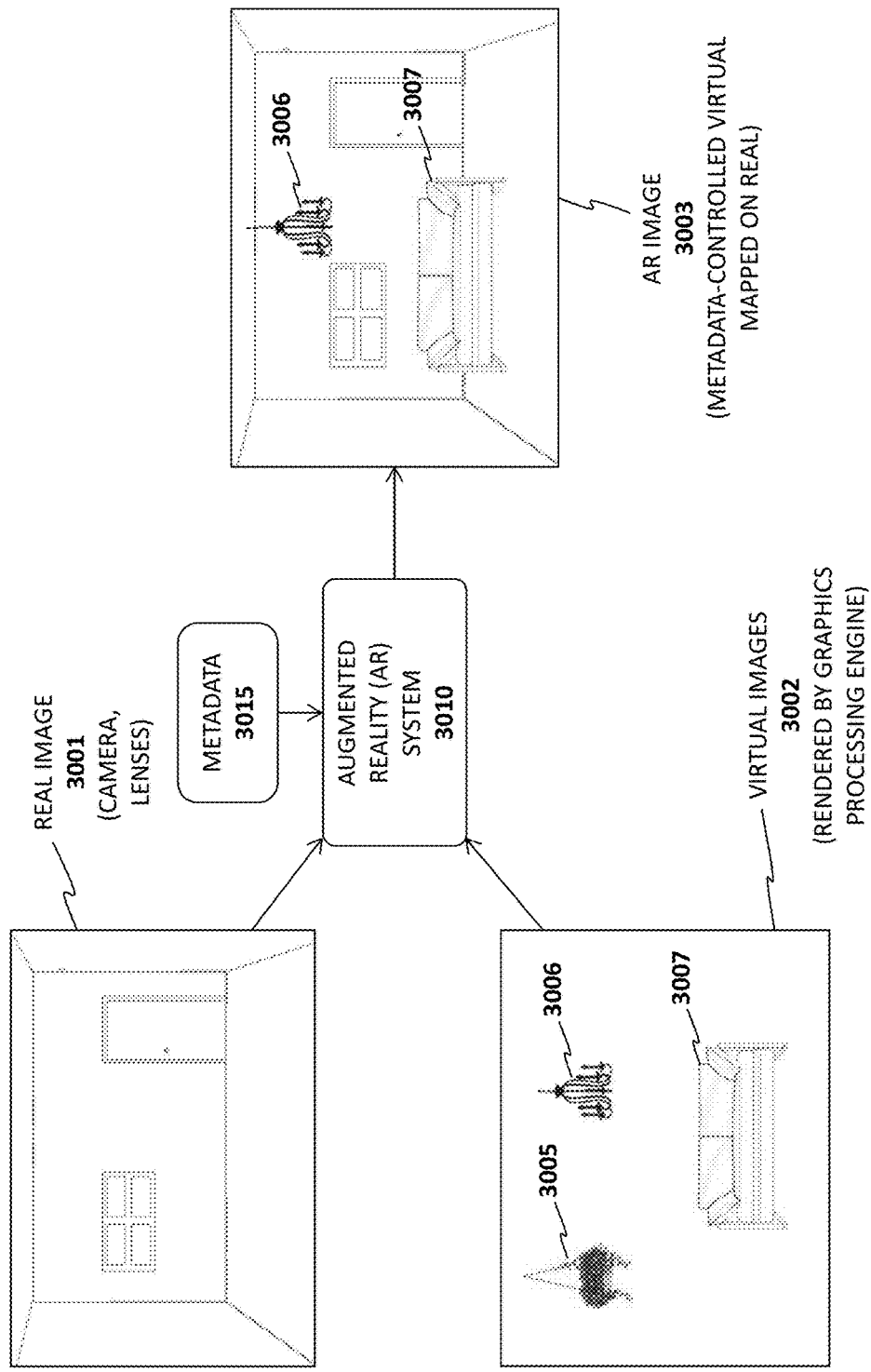
FIG. 30 illustrates an augmented reality system in accordance with one embodiment of the invention.

FIG. 30 illustrates the basic principles of one embodiment of the invention. In particular, the AR system 3010 includes a graphics rendering engine for processing tiles of one or more virtual images 3002 in accordance with a set of metadata 3015. In one embodiment, the metadata 3015 defines a control surface specifying whether virtual tiles of individual virtual images 3005-3007 will be combined with tiles of a real image 3001 captured via a camera or lenses integrated on a head mounted display (HMD). In the illustrated example, the real image 3001 is a room and the virtual images 3002 include a hanging plant 3005, a chandelier 3006 and a sofa 3007. The metadata 3015 of this example specifies that the tiles for the chandelier 3006 and sofa 3007 are to be rendered by the graphics processing engine and combined with the real image, resulting in the final AR image 3003. However, as illustrated, the metadata also specifies that the image tiles for the hanging plant 3005 are not to be rendered (e.g., the hanging plant is fully transparent). In one implementation, the metadata comprises one bit per virtual tile to indicate whether the tile is to be displayed in the final image (e.g., 1=displayed, 0=not displayed). In another implementation, the metadata may include two or more bits for each tile to indicate whether the tile is to be displayed and also whether an alpha value is to be used to specify a level of transparency for each virtual tile. For example, with two bits, the value 00 may indicate that the virtual tile is fully transparent (not displayed); the value 01 may indicate that the virtual tile is fully opaque (displayed over the corresponding image tile); the value 10 may indicate that the virtual tile is to be blended with the corresponding real tile in accordance with a particular alpha value; and the value 11 may indicate that the virtual tile is compressed and is to be blended. In other embodiments, additional bits are included within the metadata to realize more precise control over the virtual tiles and the manner in which the virtual tiles are combined with the real tiles (e.g., the level/type of blending, the level of compression, etc).

Figure 31:
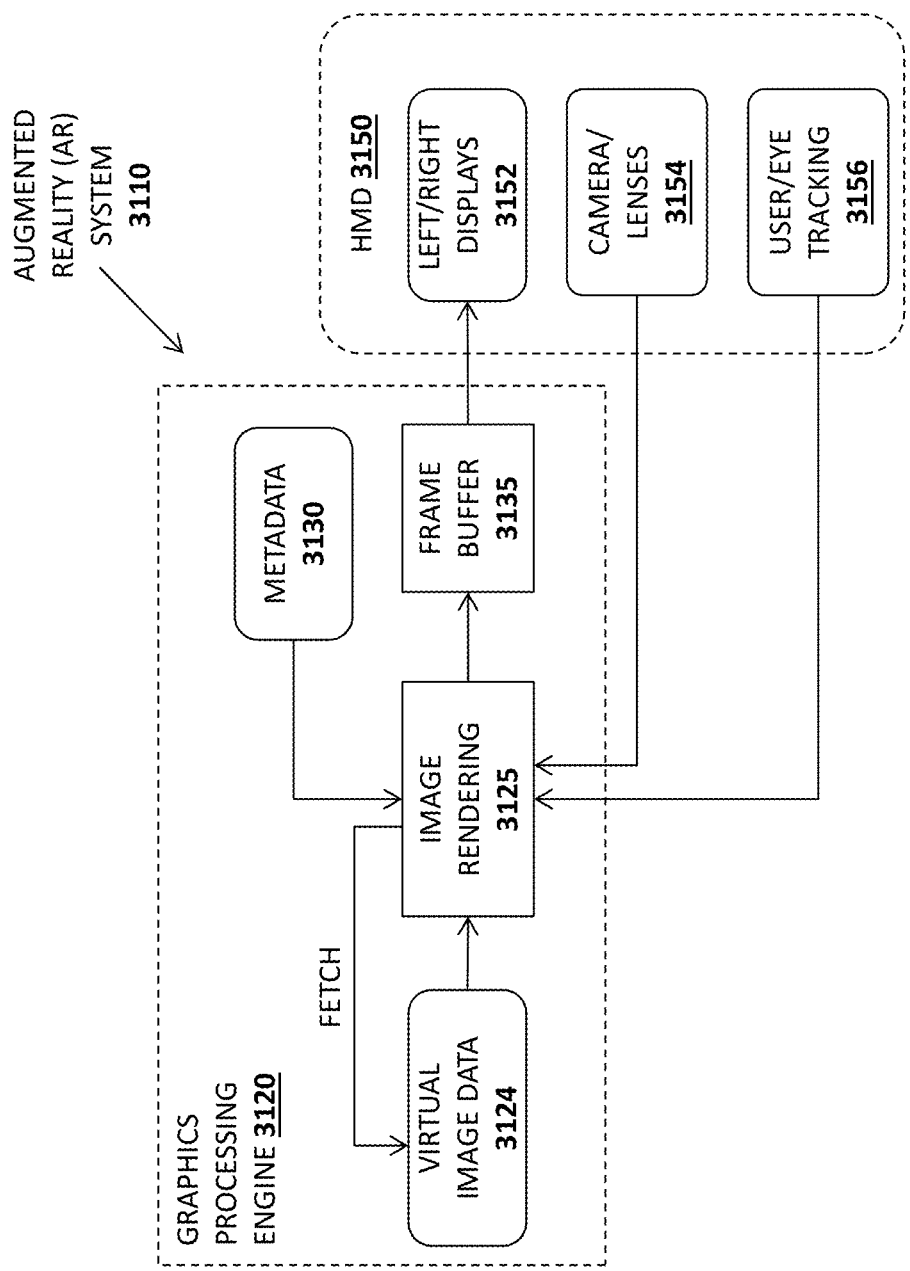
FIG. 31 illustrates an augmented reality system in accordance with one embodiment of the invention.

FIG. 31 illustrates an exemplary graphics processing engine 3120 which includes an image rendering pipeline 3125 for fetching virtual image data 3124 in accordance with metadata 3130. In one embodiment, the image rendering pipeline 3125 only fetches virtual image data 3124 for virtual image tiles which will be visible on the display(s) 3152 of the HMD 3150 (i.e., not fully transparent or obstructed as specified by the metadata 3130). The image rendering pipeline 3125 combines the virtual image tiles with real image tiles captured via a camera and/or lenses 3154 on the HMD 3150, blending the tiles in accordance with specified alpha values, and storing the resulting image frame within frame buffer 3135. In one embodiment, a user/eye tracking device 3156 integrated on the HMD 3150 tracks the orientation and movement of the user and/or the user's' eyes. The image rendering pipeline 3125 adjusts the virtual 3D images in accordance with this data (e.g., so that the virtual images have the correct orientation relative to the real images). Once the real and virtual images have been combined to render the final image within the frame buffer 3135, it is displayed within a left or right display 3152 on the HMD. While only a single display 3152 is shown for simplicity, it will be appreciated that the underlying principles of the invention may be used in a stereoscopic HMD 3150 with separate left and right displays (in addition to left and right graphics processing engines 3120).

The use of metadata 3130 defining a control surface to specify virtual image tiles which will not be displayed results in significantly improved performance over current AR systems. In particular, using these techniques, virtual image tiles which will not be displayed in the final image are not fetched from memory, thereby conserving memory bandwidth. Moreover, other graphics processing operations will not be performed using these tiles, further improving performance.

Figure 32:
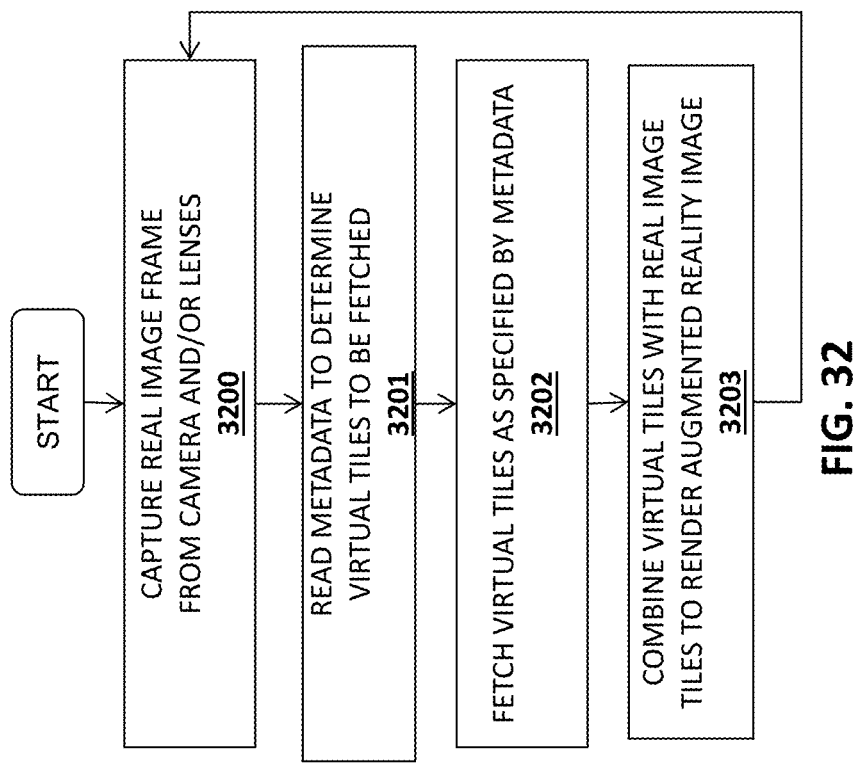
FIG. 32 illustrates a method in accordance with one embodiment of the invention.

A method in accordance with one embodiment of the invention is illustrated in FIG. 32. The method may be implemented within the context of the system architectures described above, but is not limited to any particular set of processing resources.

At 3200, the real image data is captured from a camera and/or set of lenses on the HMD. At 3201, control surface metadata is read to determine the virtual tiles which need to be fetched (e.g., loaded from the memory subsystem). For example, only those virtual tiles which will be displayed may be fetched. At 3202, the virtual tiles are fetched and, at 3203, the virtual files are combined with the real image tiles to render the augmented reality image. As mentioned, virtual tiles which are partially transparent may be blended with the corresponding tiles from the real image.

In embodiments, the term "engine" or "module" or "logic" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, an engine or a module may be implemented in firmware, hardware, software, or any combination of firmware, hardware, and software.

I. Non-Balanced VR Rendering

If the user has one dominant eye and one non-dominant eye, then lower quality video may be delivered to the non-dominant eye. In fact, even if the user does not have a dominant eye, the same principle can be applied since the human visual system will "blend" the image presented to the left eye together with the image presented to the right eye into a single perceived image with depth. So, in the following text, we will use the terms low-quality (LE) eye and high-quality eye (HE) instead of dominant and non-dominant.

Render lower quality to LE using a combination of (1) lower resolution for LE, followed by scaling up, (2) coarser pixel shading for the LE, (3) timewarp for LE every other frame, without additional rendering, (4) reduced quality for ambient occlusion for LE, (5) execution of different shader code (shader level of detail), e.g., lower shading quality for LE, (6) lower frame rate for LE.

Current virtual reality (VR) systems render separate image streams for the user's left and right eyes using a homogeneous set of execution resources. For example, one GPU may be allocated to the user's left eye and an identical GPU may be allocated to the use's right eye.

One embodiment of the invention takes advantage of the fact that a user may have one eye which is more dominant than the other and may allocate graphics processing resources accordingly. In fact, even if the user does not have a dominant eye, the same principle can be applied since the human visual system will "blend" the image presented to the left eye together with the image presented to the right eye into a single perceived image with depth. So, in the following text, we will use the terms low-quality (LE) eye and high-quality eye (HE) instead of dominant and non-dominant. This simple means that we may render images of lower quality for the LE and higher for the HE. For example, if the GPUs have different performance levels, the lower performance GPU will be used for the LE. This can be generalized to selecting different sets of GPU/CPU hardware resources to render for the left/right eye based on which is dominant or which eye is selected to be rendered with lower quality.

Figure 33:
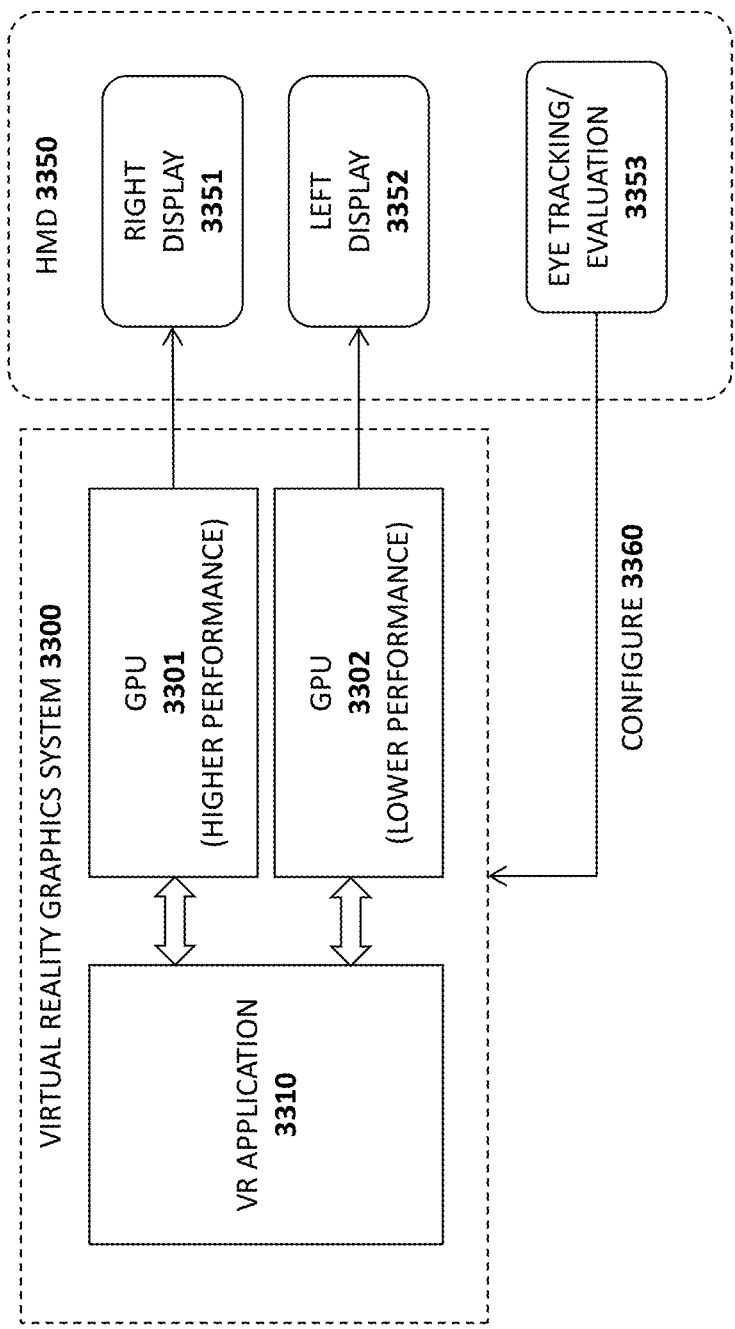
FIG. 33 illustrates one embodiment in which graphics processing units having different performance characteristics are used for the left and right displays.

One embodiment will be described with respect to FIG. 33 which illustrate a graphics processing system 3300 communicatively coupled to a head-mounted display (HMD) 3350. A VR application 3310 is executed, generating graphics commands and data to be executed by the graphics processing system 3300. The graphics processing system 3300 may include one or more graphics processing units (GPUs) 3301-3302, each with a separate graphics pipeline to execute the graphics commands and render the image frames on a left display 3340 (for displaying images for the user's left eye) and a right display 3341 (for displaying images for the user's right eye).

Various techniques may be employed to determine the level of disparity between the user's left and right eyes. For example, the user may be prompted to manually enter data related to user's vision (e.g., the amount of myopia or hyperopia, the amount of astigmatism, etc). In one embodiment, an eye tracking/evaluation module 3353 on the HMD 3350 determines the user's dominant eye and configures the GPUs 3301-3302 accordingly. For example, an eye test may be administered to the user prior to executing the VR application 3310, potentially using cameras of the eye tracking/evaluation module 3353 to automatically identify the user's dominant and non-dominant eyes and potentially the level of disparity between the left/right eyes. The results of the eye test may then be stored and associated with the user's account. Alternatively, one may select the lower-quality eye randomly, due to the human visual system's ability to blend images for the left and right eye.

Regardless of how the user's vision is determined, in one embodiment, a configuration signal 3360 is sent to associate the higher performance GPU 3301 with the user's high-quality eye (the right eye in the illustrated example) and the lower-performance GPU 3302 with the user's low-quality eye (the left eye in the example). As a result, a higher quality image (e.g., higher resolution, frame rate, etc) may be achieved on the display 3351 viewed by the user's dominant eye or HE, thereby improving the end user experience.

Figure 34:
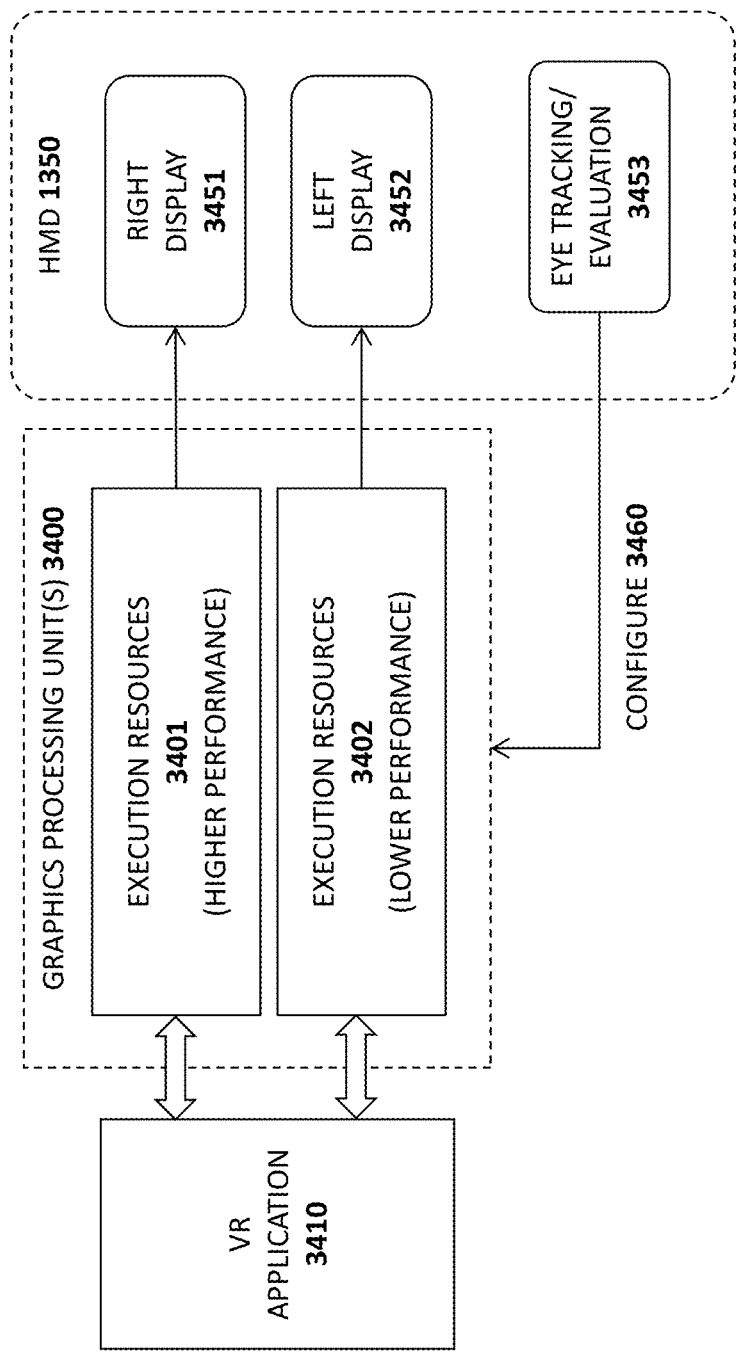
FIG. 34 illustrates one embodiment in which execution resources having different performance characteristics are used for the left and right displays.

In one embodiment, rather than allocating an entire GPU to each eye, individual execution resources may be allocated in accordance with the user's vision. FIG. 34, for example illustrates an embodiment in which a first set of (higher performance) execution resources 3401 are allocated to render image frames for the user's HE while a second set of (lower performance) resources 3402 are allocated to render image frames for the user's LE. The sets of execution resources 3401-3402 may be resources on a single GPU or spread across multiple GPUs.

Figure 35:
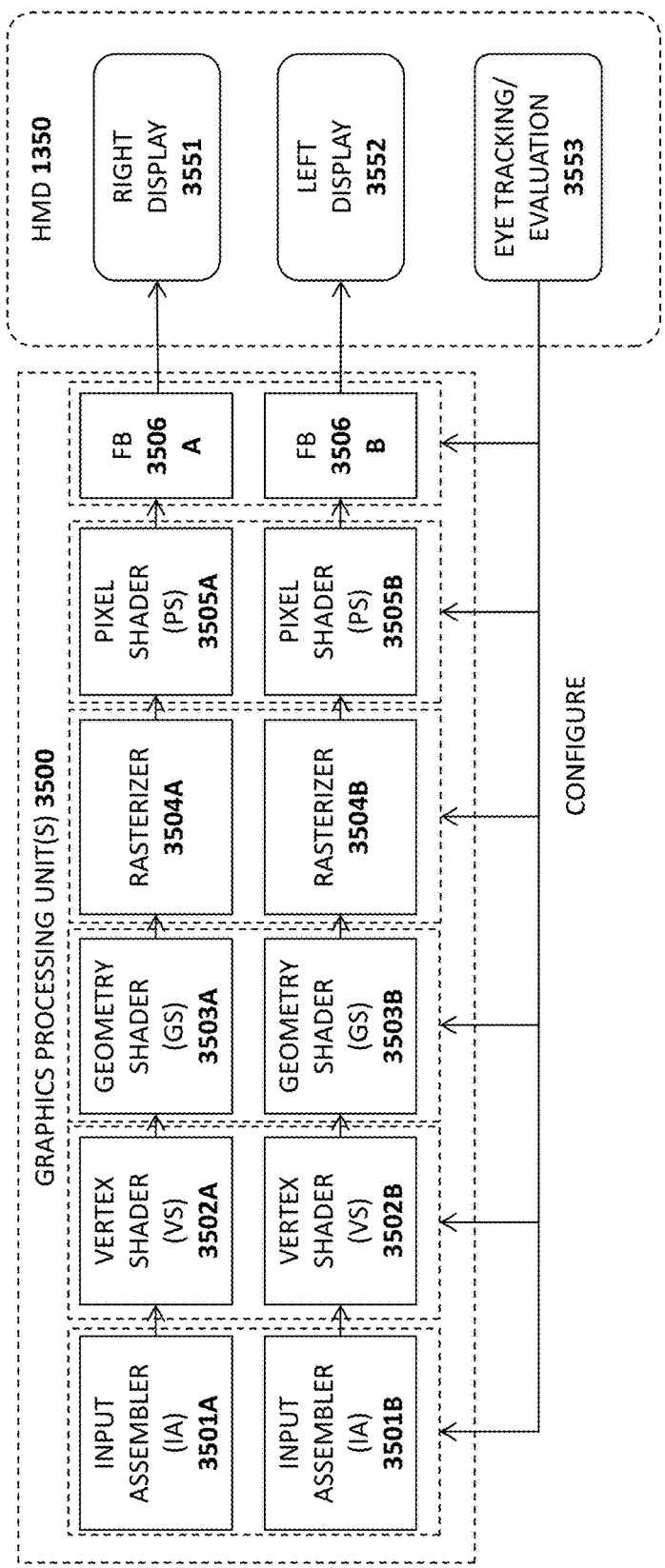
FIGS. 35 and 36 illustrate embodiments in which execution stages are configured differently for the left and right displays.

As illustrated in FIG. 35, the different sets of execution resources 3501A-3506A, 3501B-3506B may be allocated at various stages of the graphics pipeline including the input assembler (IA) 3501A-B which reads index and vertex data and a vertex shader (VS) 3502A-B from memory; the vertex shader stage 3502A-B which performs shading operations on each vertex (e.g., transforming each vertex's 3D position in virtual space to the 2D coordinate at which it appears on the screen) and generates results in the form of primitives (e.g., triangles); the geometry shader (GS) stage 3503A-B which takes a whole primitive as input, possibly with adjacency information (e.g., three vertices for each triangle); a rasterization stage 3504A-B which rasterizes primitives provided by the geometry shader; and a pixel shader (PS) stage 3505A-B, which performs shading operations on each of the individual pixels which are stored, frame by frame, within a frame buffer 3506A-B prior to being displayed on the HMD 3550. For example, in one embodiment, different number of execution units may be allocated to the right and left displays 3551-3552 for performing rasterization and pixel shading operations (e.g., allocating more execution units to the dominant eye).

In addition, in one embodiment, different graphics processing and/or video processing techniques may be applied at each stage of the pipeline to provide lower quality video to the LE. The lower quality graphics or video may be rendered to the non-dominant eye or LE using a combination of (1) lower resolution (with upscaling); (2) coarser pixel shading; (3) using time warping operations for the LE periodically (e.g., every other frame), without additional rendering; (4) reduced quality for ambient occlusion; (5) execution of different shader code; and (6) a lower frame rate. Of course, the underlying principles of the invention may be implemented using any technique or combination of techniques which results in differentiated graphics/video quality.

One embodiment uses a single GPU. The idea is essentially the same, except that the entire GPU is first allocated to render the image to the LE, and then it is allocated to render the HE (or vice versa). There can also be some overlap in the rendering of the LE and the HE. For example, during the end of the rendering of the LE, one may start rendering of the HE in parallel if there are resources available. It may also be possible to interleave some rendering for the LE with some rendering for the HE. For example, it may be beneficial to render a depth only pass to the LE followed by the HE, or doing both at the same time. The same idea applies to ray tracing as well.

Figure 36:
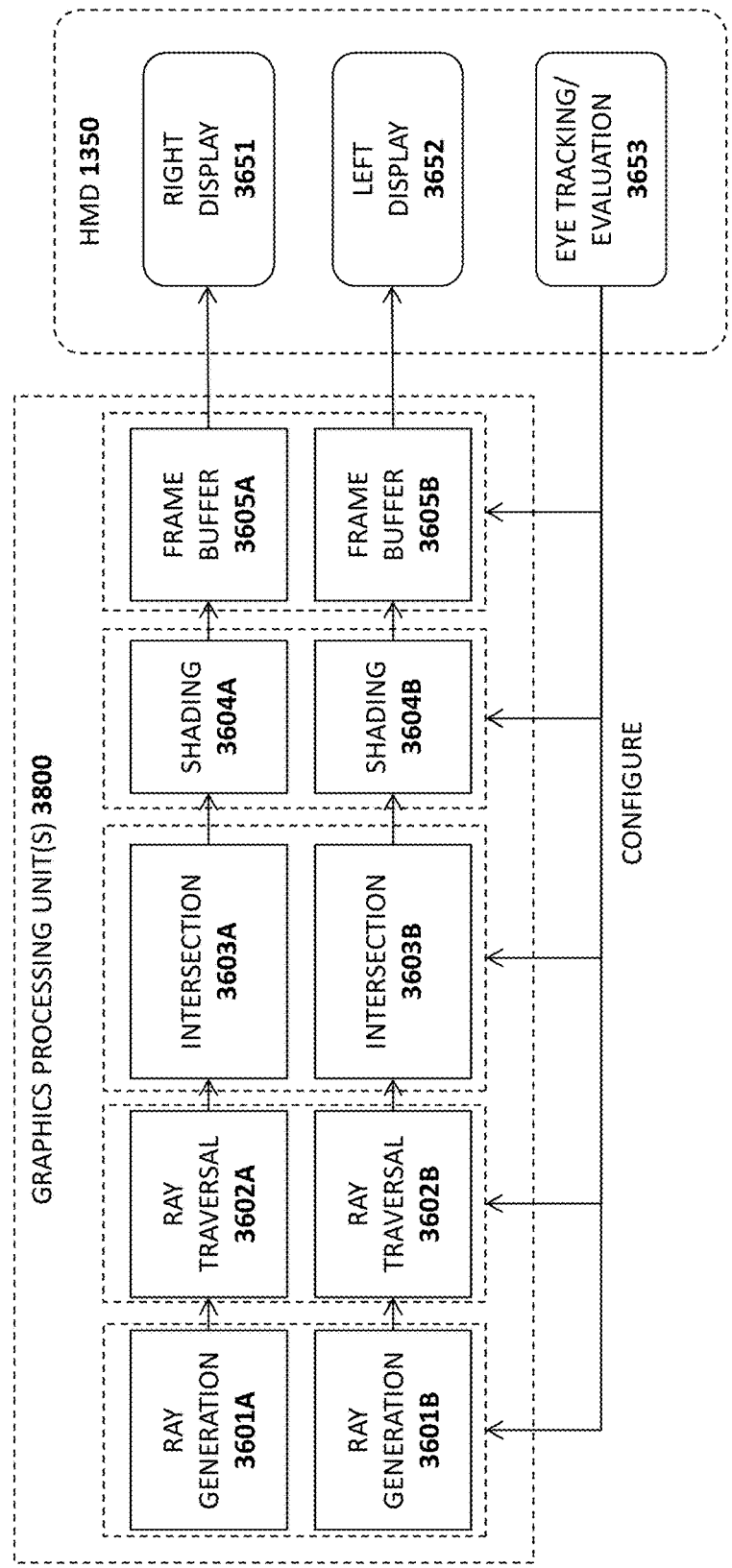

While a rasterization-based pipeline is illustrated in FIG. 35, the underlying principles of the invention are not so limited. For example, FIG. 36 illustrates one embodiment of the invention implemented within a ray tracing-based pipeline with various pipeline stages 3601A-3605A, 3601A-3605A in which resources may be allocated in accordance with the user's dominant/non-dominant eye or LE/HE. The illustrated stages include a ray generation module 3601A-B which generates rays for further processing. For example, one embodiment performs breadth-first ray tracing per image tile, where a tile denotes a small fixed-size rectangular region. In one embodiment of a breadth-first implementation, one ray per pixel is generated for each iteration on the image tile. A ray traversal module 3602A-B traverses each ray against a bounding volume hierarchy (BVH) or other acceleration data structure. One or more intersection modules 3603A-B test the ray against one or more triangles or other primitives, and in the end, the traversal and intersection units must find the closest primitive that each ray intersects. One or more shader units 3604A-B then perform shading operations on the resulting pixels which are stored, frame by frame, within a frame buffer 3605A-B prior to being displayed on the HMD 3550. Various different types of hardware and software may be allocated at each stage of the pipeline in accordance with the user's vision (e.g., a different number of execution units for performing shading operations).

Figure 37:
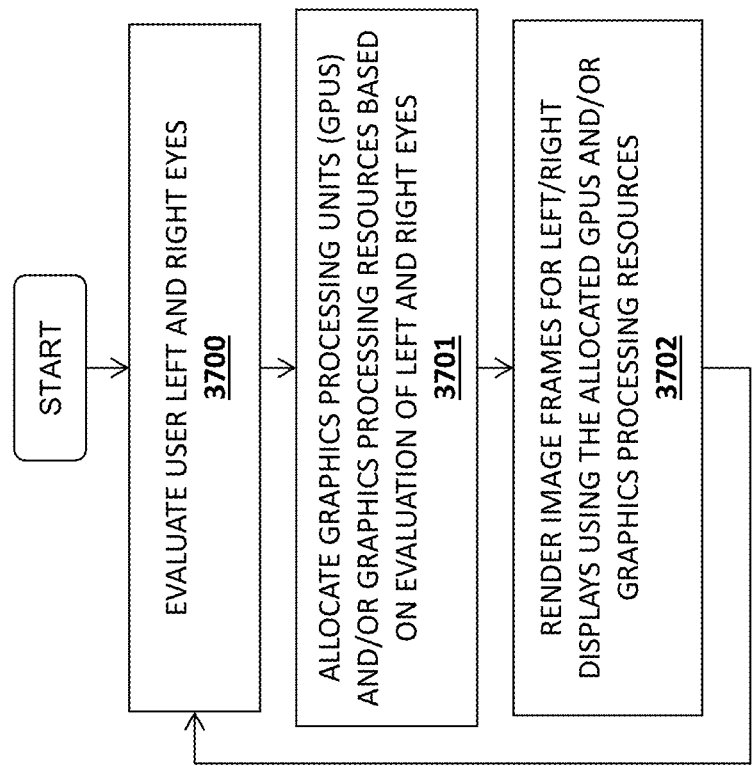
FIGS. 37-38A-B illustrate methods in accordance with embodiments of the invention.

A method in accordance with one embodiment of the invention is illustrated in FIG. 37. The method may be implemented within the context of the system architectures described herein, but is not limited to any particular system architecture.

At 3700, the user's eyes are evaluated to identify which (if any) eye is dominant (e.g., by executing an eye test and monitoring the user's responses). As mentioned, rather than performing an evaluation, the user may manually identify which eye is dominant. Alternatively, one may just choose one eye to the LE and the other to be HE.

At 3701, graphics processing units (GPUs) and/or graphics processing resources are allocated based on the evaluation of the user's left and right eyes. For example, a greater number of hardware resources may be allocated at one or more stages of the graphics processing pipeline. In addition, different graphics/video processing techniques may be employed at each stage in accordance with the user's vision (e.g., a time warp may be used more frequently for the user's non-dominant eye).

At 3702, image frames for the left/right displays are rendered using the allocated GPUs and/or graphics processing resources.

J. Multi-Planar Transmission

Time-warp for virtual reality (VR) has been performed on a host system before transmitting a display image to the head mounted display (HMD). This process requires pre-emption of the host system's GPU workload and contributes to the motion-to-photon latency. Instead, the host system could transmit non-warped images to the HMD, and let the HMD perform the time-warp. However, a non-warped image consists of significantly more data than a corresponding warped image, so the display link bandwidth requirements would increase significantly.

The embodiments of the invention include techniques to transmit non-warped images with similar bandwidth requirements to warped images, enabling HMD-based warping with very low motion-to-photon latency. In one embodiment, the host system renders a set of planar projections, which together covers the displayed solid angle. Rendering multiple projections instead of one requires 2× to 3× fewer pixels to compute and transfer, compared to rendering a single projection. To display a new frame, the entire set of planar projections are transmitted from the host to the HMD, one projection after the other, accompanied by some metadata associated with each projection. The HMD then performs time-warp based on the latest reading of position data, just before displaying the image. Subsets of the planar projections can be omitted from the transmission if they are known to not contribute to the final image, further reducing the bandwidth requirements.

The host system may include a CPU, a GPU, memory, and software (including an operating system, a user application, drivers, libraries, middleware, firmware), and optionally tracking peripherals such as cameras, collectively referred to as the "host". Processing performed on the host may take place on any of these hardware resources, as instructed by any of the software components. The virtual reality headset may include several sensors of various kinds, processing units, a display, memory, and software, collectively referred to as "HMD".

Figure 38A:
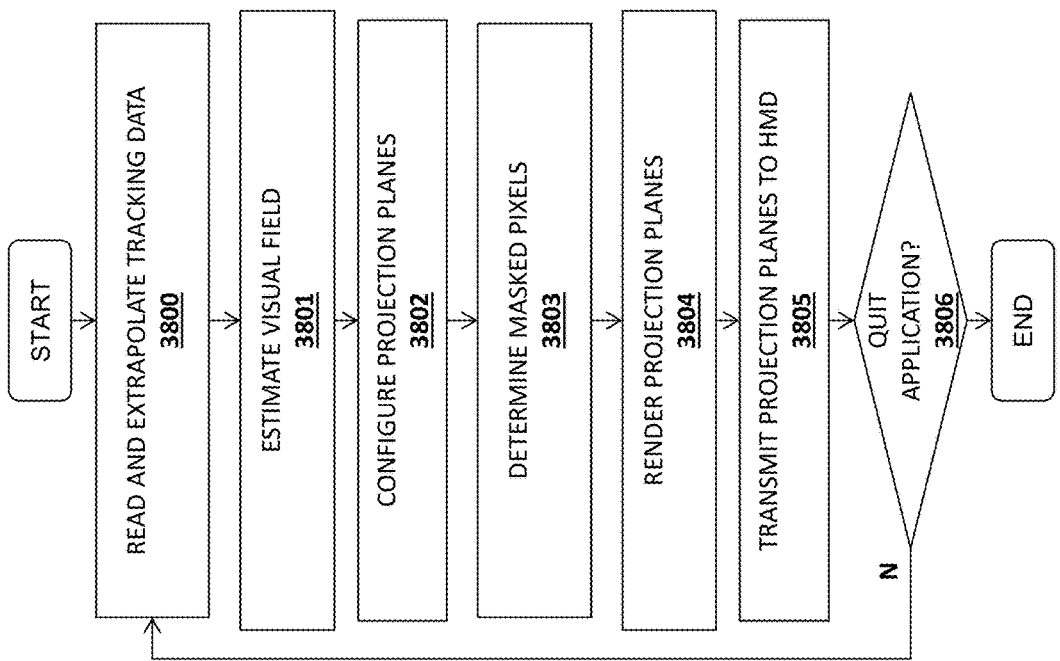

In one embodiment, illustrated in FIG. 38A, at 3800 the host starts frame processing by reading the latest available head tracking data, and optionally extrapolates this information to the expected frame display time. At 3801, the host then estimates what the displayed visual field will be at the time the frame will become visible to the user. The visual field estimate may or may not be padded to accommodate estimation inaccuracies.

At 3802, the host then configures one or more planar projections that together subtend the entire estimated visual field. Furthermore, the host may determine that subsets of the planar projections may be outside the estimated visual field and tag these subsets as invisible. As indicated at 3803, such regions tagged as invisible are referred to as being "masked".

At 3804, the host then renders all of these planar projections, possibly omitting masked regions. The rendered projections are then transmitted to the HMD at 3805, one at a time. A rendered projection includes the projection transform, each (non-masked) pixel's color, and possibly each (non-masked) pixel's depth, and possibly information about which pixels are masked. The process repeats until the application is terminated at 3806.

Figure 38B:
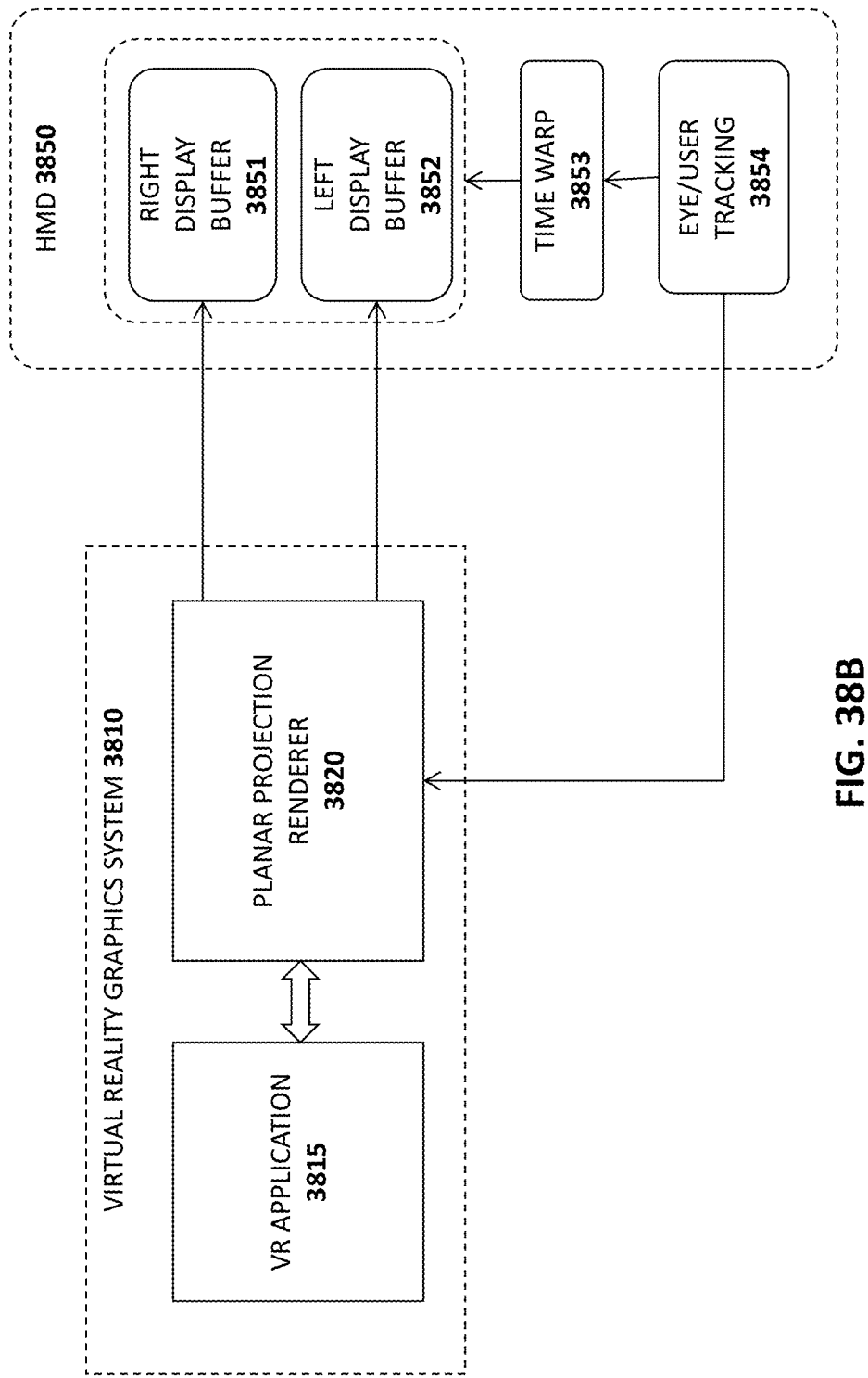
Figure 40:
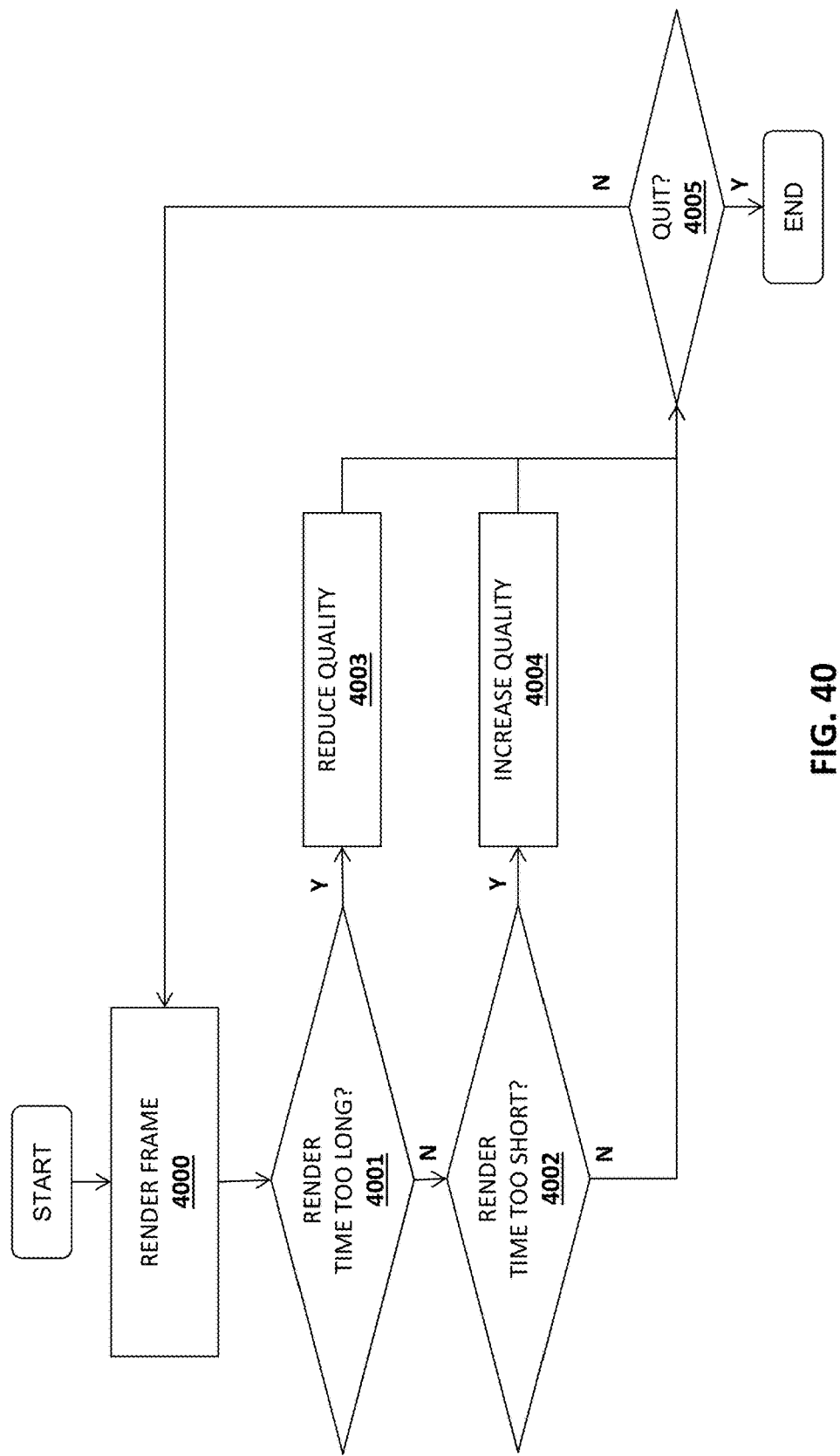
FIG. 40 illustrates one embodiment of an intraframe variable frame rate renderer.

FIG. 38B illustrates one embodiment of a VR graphics system 3810 on which a planar projection renderer 3820, in response to a VR application 3815, renders a set of planar projections, which together covers the displayed solid angle. As mentioned, the planar projection renderer configures one or more planar projections that together subtend the entire estimated visual field. To display a new frame, the entire set of planar projections are transmitted from the planar projection renderer 3820 to right and left display buffers 3851-

3852 on the HMD 3850. In one embodiment, one projection is transmitted after the other, accompanied by some metadata associated with each projection. A time warp module 3853 on the HMD 3850 then performs a time-warp based on the latest reading of position data provided by eye/user tracking sensors 3854, just before displaying the image. As mentioned, subsets of the planar projections can be omitted from the transmission if they are known to not contribute to the final image, further reducing the bandwidth requirements.

FIG. 39 illustrates a method performed on the HMD in accordance with one embodiment of the invention. For every displayed frame, the HMD starts at 3900 by reading the latest tracking data, and optionally extrapolating this information to the expected frame display time. At 3901, the HMD then locates the latest set of projections that have completed transmission from the host. This latest set of projections will be used for the remainder of the frame processing, even if a subsequent set of projections finish transmission during said frame processing.

For each display pixel, at 3902 the HMD determines which projection plane and which pixel of said projection plane will be visible at that display pixel, at the time the display pixel will be lit. The display pixel will finally be lit at 3903 using the color of the determined pixel of the corresponding projection plane. The process repeats until the HMD is shut down, determined at 3806.

The determination of which pixel of which projection plane will be visible may or may not use depth information to correct for head position estimate inaccuracies. The transmitted projection transform may be in the form of a 3×3 matrix. In other embodiments, other forms may be used, such as different matrices, or quaternions and vectors, to convey an equivalent description of the projection plane. Information about which pixels are masked may in some embodiments be transferred less frequently than every frame. In such embodiments, the HMD will assume that subsequent frames are masked in the same way, until new information about masked pixels is transmitted.

The embodiments of the invention provide numerous beneficial features including, but not limited to the transmission of un-warped images to the HMD; performing time-warp on the HMD; transmitting several projections that are displayed simultaneously; transmitting projection information for each projection; and omitting transmission of masked pixels.

J. Intraframe Variable Frame Rate

Virtual reality requires a high frame rate to create an illusion of a stable environment. Achieving a high frame rate when rendering visually intensive content is computationally demanding, to the extent that the end users' hardware often cannot keep up with the computational demands. This can result in missed frames, when the render time of a given frame exceeds the display refresh period. Such missed frames can be jarring to the end user.

In one embodiment, every second frame, only part of the frame centered at the user's gaze is rendered, or straight ahead if no gaze information is available. The parts not rendered are instead populated by re-projecting the previous frame. The extents of the partial frame that can be rendered is dynamically determined such that the average frame time fits within the display refresh period. To even out the workload, half of the peripheral region can be rendered on even frames and the other half of the peripheral region can be rendered on odd frames.

The entire process may be performed by hardware, software or any combination thereof. In one embodiment, it is performed either by the application, or jointly by the application and graphics drivers.

In one embodiment, the VR application keeps track of the time required to render each frame at 4000. It also maintains a quality fraction between zero and one. If the render time approaches or surpasses the time budget, determined at 4001, the quality fraction is reduced at 4003, but never below some pre-specified quality threshold. If the render time is well below the time budget, determined at 4002, the quality fraction is increased at 4004 but never above one. In one embodiment, at 4001, a determination is made as to whether the render time is above a first specified threshold and, at 4002, a determination is made as to whether the render time is below a second specified threshold. In one embodiment, if the render time is between these two thresholds, then no action is taken and the process repeats for the next frame, assuming that the application is not terminated, determined at 4005.

Rendering of a frame 4000 begins by determining the region which to render accurately for the frame, hereafter referred to as the "accurate region." The accurate region consists of two subsets, namely (1) the region of interest, and (2) approximately half of the remaining frame, hereafter referred to as the secondary region. The region of interest can be a rectangular region centered around the user's gaze, if gaze information is available. It can be the center of the image if gaze information is not available. While these are the most useful cases, other embodiments are also possible, such as the region's surrounding important objects in the image. In one embodiment, the quality fraction specifies how large a fraction of the total frame may be included in the region of interest. A quality fraction of one therefore means that the entire image is part of the region of interest.

In one embodiment, the secondary region is determined as follows. The parts of the frame not included in the region of interest is split into two subsets. In some embodiments, this split is just the left and the right half of the frame. In other embodiments, the frame is divided according to a checkerboard pattern in which each tile can be one or more pixels in size. One of the two subsets is chosen as secondary region on even frames, and the other subset is chosen as secondary region on odd frames.

The accurate region is then rendered as usual. Standard mechanisms such as a stencil buffer may be employed to exclude the parts of the frame that are not part of the accurate region, hereafter referred to as the "inaccurate region." In some embodiments, if the hardware supports spatially varying quality settings, such as lossy framebuffer compression algorithms, then the secondary region may be configured to use lower quality settings than the region of interest.

Finally, in one embodiment, the inaccurate region is filled by re-projecting the previous frame's content. In some embodiments, re-projection can be based on the user's head movement. In other embodiments, a combination of head movement and per-pixel velocity information can be employed. In other embodiments still, per-pixel depth information can also be employed.

Figure 41:
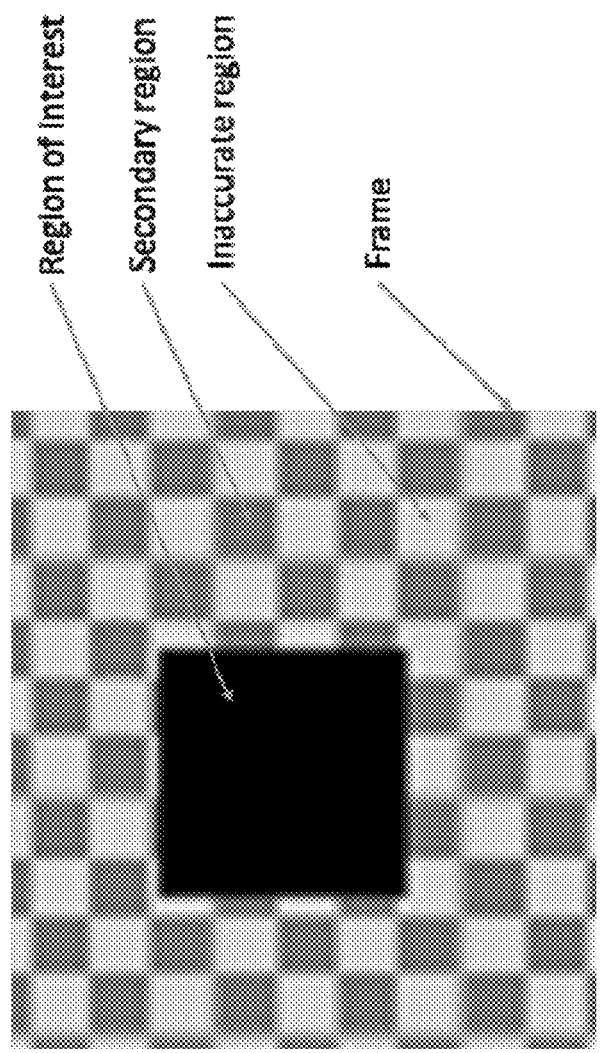
FIG. 41 illustrates an exemplary region of interest.

FIG. 41 illustrates an exemplary group of regions in which black indicates the region of interest, dark grey indicates the secondary region, and light grey indicates the inaccurate region. In one embodiment, every second frame, the grey checkerboard pattern is inverted.

Figure 42:
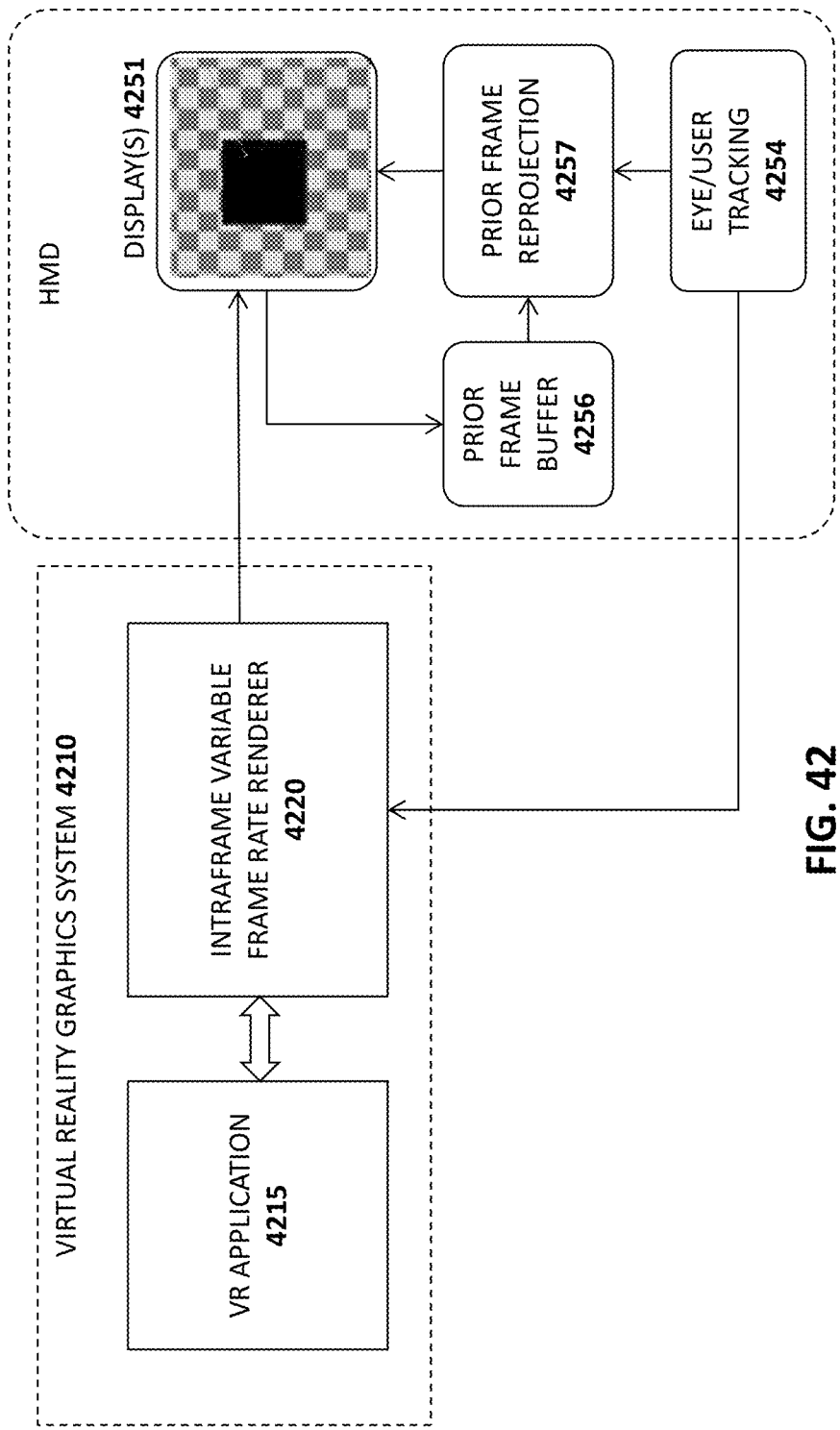
FIG. 42 illustrates one embodiment of an intraframe variable frame rater renderer.

FIG. 42 illustrates a virtual reality graphics system 4210 with an intraframe variable frame rate renderer 4220 which renders only part of a frame centered at the user's gaze every Nth frame (or straight ahead if no gaze information is available). The user's gaze may be determined from eye/user tracking sensors 4254 as illustrated. In one embodiment, the portions of the frame not rendered on the HMD display(s) 4251 are instead populated by re-projecting the previous frame. The extents of the partial frame that can be rendered is dynamically determined such that the average frame time fits within the display refresh period. As mentioned, to even out the workload, half of the peripheral region can be rendered on even frames and the other half of the peripheral region can be rendered on odd frames.

The entire process may be performed by hardware, software or any combination thereof. In one embodiment, it is performed either by the application, or jointly by the application and graphics drivers.

In one embodiment, the VR application keeps track of the time required to render each frame at 4000. It also maintains a quality fraction between zero and one. If the render time approaches or surpasses the time budget, determined at 4001, the quality fraction is reduced at 4003, but never below some pre-specified quality threshold. If the render time is well below the time budget, determined at 4002, the quality fraction is increased at 4004 but never above one. In one embodiment, at 4001, a determination is made as to whether the render time is above a first specified threshold and, at 4002, a determination is made as to whether the render time is below a second specified threshold. In one embodiment, if the render time is between these two thresholds, then no action is taken and the process repeats for the next frame, assuming that the application is not terminated, determined at 4005.

The terms "module," "logic," and "unit" used in the present application, may refer to a circuit for performing the function specified. In some embodiments, the function specified may be performed by a circuit in combination with software such as by software executed by a general purpose processor.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A graphics processing system comprising:
   a compute cluster comprising:
      global illumination circuitry and/or logic to perform global illumination operations on graphics data in response to execution of a virtual reality application and to responsively generate a stream of samples, wherein the stream of samples is generated based on an expected viewpoint of a user of a virtual reality headset received from a render node;
      a filtering/compression module to perform filtering and/or compression operations on the stream of samples to generate filtered/compressed samples; and
      a network interface to communicatively couple the compute cluster to a network, the filtered/compressed samples to be streamed over the network;
   the render node to receive the filtered/compressed samples streamed over the network, the render node comprising:
      decompression circuitry/logic to decompress the filtered/compressed samples to generate decompressed samples;
      a sample buffer to store the decompressed samples;
      sample insertion circuitry/logic to asynchronously insert samples into a light field, wherein the samples are retrieved from the sample buffer based on the expected viewpoint of the user of the virtual reality headset; and
      a light field rendering circuit/logic to render the light field using the inserted samples; and
   the virtual reality headset having one or more display screens for displaying results output by the light field rendering circuit/logic.

2. The graphics processing system as in claim 1 further comprising:
   viewpoint analysis and processing circuitry/logic to receive an indication of the user's current viewpoint from the virtual reality headset and determine the expected viewpoint, the viewpoint analysis and processing circuitry/logic to provide the expected viewpoint to both the render node and the compute cluster.

3. The graphics processing system as in claim 2 wherein the virtual reality headset includes eye tracking sensors to sense the user's viewpoint.

4. The graphics processing system as in claim 2 wherein the viewpoint analysis and processing logic determines the expected viewpoint based on a combination of the current viewpoint and one or more prior viewpoints from prior frames.

5. The graphics processing system as in claim 4 wherein the global illumination circuitry and/or logic is to generate samples based on an expectation that the user's viewpoint may continue moving in the same direction as detected over successive prior frames.

6. The graphics processing system as in claim 2 wherein the sample insertion circuitry/logic selects samples from the sample buffer based on the expected viewpoint.

7. The graphics processing system as in claim 1, wherein the generation of the stream of samples comprises ray tracing on the graphics data.

8. The graphics processing system as in claim 2 wherein the global illumination circuitry and/or logic is to generate the stream of samples to include samples for a region around the expected viewpoint.

9. The graphics processing system as in claim 2 wherein the sample insertion circuitry/logic selects samples to cover the expected viewpoint and a region around the expected viewpoint.

10. The graphics processing system as in claim 1, wherein the compute cluster comprises a plurality of virtual machines, and one virtual machine is allocated to the virtual reality application.

* * * * *